US011243960B2

(12) United States Patent
Griffith et al.

(10) Patent No.: US 11,243,960 B2
(45) Date of Patent: *Feb. 8, 2022

(54) CONTENT ADDRESSABLE CACHING AND FEDERATION IN LINKED DATA PROJECTS IN A DATA-DRIVEN COLLABORATIVE DATASET PLATFORM USING DISPARATE DATABASE ARCHITECTURES

(71) Applicant: data.world, Inc., Austin, TX (US)

(72) Inventors: David Lee Griffith, Austin, TX (US); Shad William Reynolds, Austin, TX (US)

(73) Assignee: data.world, Inc., Austin, TX (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/404,113

(22) Filed: May 6, 2019

(65) Prior Publication Data

US 2019/0361891 A1   Nov. 28, 2019

Related U.S. Application Data

(63) Continuation-in-part of application No. 15/927,004, filed on Mar. 20, 2018, now Pat. No. 11,036,716, and
(Continued)

(51) Int. Cl.
*G06F 7/00* (2006.01)
*G06F 16/2458* (2019.01)
(Continued)

(52) U.S. Cl.
CPC ...... *G06F 16/2458* (2019.01); *G06F 12/0802* (2013.01); *G06F 16/248* (2019.01)

(58) Field of Classification Search
CPC ............... G06F 16/248; G06F 16/2458; G06F 16/9535; G06F 12/0802
(Continued)

(56) References Cited

U.S. PATENT DOCUMENTS 6,144,962 A   11/2000 Weinberg et al.
6,317,752 B1  11/2001 Lee et al.
(Continued)

FOREIGN PATENT DOCUMENTS

CA   2820994 A1   1/2014
CN   103425734 B   6/2017
(Continued)

OTHER PUBLICATIONS

Hu, Xiaoqin, Final Office Action dated Oct. 31, 2019 for U.S. Appl. No. 15/454,969.
(Continued)

*Primary Examiner* — Md I Uddin
(74) *Attorney, Agent, or Firm* — Kokka & Backus, PC

(57) ABSTRACT

Various embodiments relate generally to data science and data analysis, computer software and systems, and wired and wireless network communications to interface among repositories of disparate datasets and computing machine-based entities configured to access datasets, and, more specifically, to a computing and data storage platform to implement computerized tools to facilitate expedited queries based on query results generated by disparate computing and database architectures, according to at least some examples. For example, a method may include generating multiple results of queries, storing the multiple results of queries in a memory, and linking each of the multiple results of queries to a portion of data stored in a graph. The method can include receiving data representing a query and accessing data representing quiescent data values to form a query result.

16 Claims, 8 Drawing Sheets

Related U.S. Application Data a continuation-in-part of application No. 15/985,702, filed on May 22, 2018, now Pat. No. 11,068,475.

(51) Int. Cl.
  *G06F 12/0802* (2016.01)
  *G06F 16/248* (2019.01)

(58) Field of Classification Search
  USPC ................................ 707/720, 721, 723, 769
  See application file for complete search history.

(56) References Cited

U.S. PATENT DOCUMENTS

| | | |
|---|---|---|
| 6,529,909 B1 | 3/2003 | Bowman-Amuah |
| 6,768,986 B2 | 7/2004 | Cras et al. |
| 6,961,728 B2 | 11/2005 | Wynblatt et al. |
| 7,080,090 B2 | 7/2006 | Shah et al. |
| 7,146,375 B2 | 12/2006 | Egilsson et al. |
| 7,680,862 B2 | 3/2010 | Chong et al. |
| 7,702,639 B2 | 4/2010 | Stanley et al. |
| 7,761,407 B1 | 7/2010 | Stern |
| 7,836,063 B2 | 11/2010 | Salazar et al. |
| 7,853,081 B2 | 12/2010 | Thint |
| 7,856,416 B2 | 12/2010 | Hoffman et al. |
| 7,877,350 B2 | 1/2011 | Stanfill et al. |
| 7,953,695 B2 | 5/2011 | Roller et al. |
| 7,987,179 B2 | 7/2011 | Ma et al. |
| 8,037,108 B1 | 10/2011 | Chang |
| 8,060,472 B2 | 11/2011 | Itai et al. |
| 8,099,382 B2 | 1/2012 | Liu et al. |
| 8,170,981 B1 | 5/2012 | Tewksbary |
| 8,275,784 B2 | 9/2012 | Cao et al. |
| 8,296,200 B2 | 10/2012 | Mangipudi et al. |
| 8,312,389 B2 | 11/2012 | Crawford et al. |
| 8,429,179 B1 | 4/2013 | Mirhaji |
| 8,521,565 B2 | 8/2013 | Faulkner et al. |
| 8,538,985 B2 | 9/2013 | Betawadkar-Norwood et al. |
| 8,583,631 B1 | 11/2013 | Ganapathi et al. |
| 8,616,443 B2 | 12/2013 | Butt et al. |
| 8,640,056 B2 | 1/2014 | Helfman et al. |
| 8,719,252 B2 | 5/2014 | Miranker et al. |
| 8,762,160 B2 | 6/2014 | Lulla |
| 8,799,240 B2 | 8/2014 | Stowe et al. |
| 8,831,070 B2 | 9/2014 | Huang et al. |
| 8,843,502 B2 | 9/2014 | Elson et al. |
| 8,856,643 B2 | 10/2014 | Drieschner |
| 8,892,513 B2 | 11/2014 | Forsythe |
| 8,935,272 B2 | 1/2015 | Ganti et al. |
| 8,943,313 B2 | 1/2015 | Glew et al. |
| 8,965,915 B2 | 2/2015 | Ganti et al. |
| 8,990,236 B2 | 3/2015 | Mizrahy et al. |
| 8,996,559 B2 | 3/2015 | Ganti et al. |
| 8,996,978 B2 | 3/2015 | Richstein et al. |
| 9,002,860 B1 | 4/2015 | Ghemawat |
| 9,171,077 B2 | 10/2015 | Balmin et al. |
| 9,218,365 B2 | 12/2015 | Irani et al. |
| 9,244,952 B2 | 1/2016 | Ganti et al. |
| 9,268,950 B2 | 2/2016 | Gkoulalas-Divanis et al. |
| 9,396,283 B2 | 7/2016 | Miranker et al. |
| 9,495,429 B2 | 11/2016 | Miranker |
| 9,560,026 B1 | 1/2017 | Worsley |
| 9,607,042 B2 | 3/2017 | Long |
| 9,613,152 B2 | 4/2017 | Kucera |
| 9,659,081 B1 | 5/2017 | Ghodsi et al. |
| 9,690,792 B2 | 6/2017 | Bartlett et al. |
| 9,696,981 B2 | 7/2017 | Martin et al. |
| 9,710,526 B2 | 7/2017 | Couris et al. |
| 9,710,568 B2 | 7/2017 | Srinivasan et al. |
| 9,720,958 B2 | 8/2017 | Bagehorn et al. |
| 9,760,602 B1 | 9/2017 | Ghodsi et al. |
| 9,769,032 B1 | 9/2017 | Ghodsi et al. |
| 9,798,737 B2 | 10/2017 | Palmer |
| 9,836,302 B1 | 12/2017 | Hunter et al. |
| 9,959,337 B2 | 5/2018 | Ghodsi et al. |
| 9,990,230 B1 | 6/2018 | Stoica et al. |
| 10,095,735 B2 | 10/2018 | Ghodsi et al. |
| 10,102,258 B2 | 10/2018 | Jacob et al. |
| 10,176,234 B2 | 1/2019 | Gould et al. |
| 10,216,860 B2 | 2/2019 | Miranker et al. |
| 10,248,297 B2 | 4/2019 | Beechuk et al. |
| 10,296,329 B2 | 5/2019 | Hunter et al. |
| 10,361,928 B2 | 7/2019 | Ghodsi et al. |
| 10,438,013 B2 | 10/2019 | Jacob et al. |
| 10,452,677 B2 | 10/2019 | Jacob et al. |
| 10,452,975 B2 | 10/2019 | Jacob et al. |
| 10,474,501 B2 | 11/2019 | Ghodsi et al. |
| 10,474,736 B1 | 11/2019 | Stoica et al. |
| 10,545,986 B2 | 1/2020 | Tappan et al. |
| 10,546,001 B1 | 1/2020 | Nguyen et al. |
| D876,454 S | 2/2020 | Knowles et al. |
| 10,558,664 B2 | 2/2020 | Armbrust et al. |
| D877,167 S | 3/2020 | Knowles et al. |
| D879,112 S | 3/2020 | Hejazi et al. |
| 10,606,675 B1 | 3/2020 | Luszczak et al. |
| 10,645,548 B2 | 5/2020 | Reynolds et al. |
| 10,664,509 B1 | 5/2020 | Reeves et al. |
| 10,673,887 B2 | 6/2020 | Crabtree et al. |
| 10,678,536 B2 | 6/2020 | Hunter et al. |
| 10,691,299 B2 | 6/2020 | Broek et al. |
| 10,691,433 B2 | 6/2020 | Shankar et al. |
| 10,769,130 B1 | 9/2020 | Armbrust et al. |
| 10,769,535 B2 | 9/2020 | Lindsley |
| 10,810,051 B1 | 10/2020 | Shankar et al. |
| 10,984,008 B2 | 4/2021 | Jacob et al. |
| 11,068,453 B2 | 7/2021 | Griffith |
| 11,068,475 B2 | 7/2021 | Boutros et al. |
| 11,068,847 B2 | 7/2021 | Boutros et al. |
| 2002/0133476 A1 | 9/2002 | Reinhardt |
| 2002/0143755 A1 | 10/2002 | Wynblatt et al. |
| 2003/0093597 A1 | 5/2003 | Marshak et al. |
| 2003/0120681 A1 | 6/2003 | Baclawski |
| 2003/0208506 A1 | 11/2003 | Greenfield et al. |
| 2004/0064456 A1 | 4/2004 | Fong et al. |
| 2005/0004888 A1 | 1/2005 | McCrady et al. |
| 2005/0010550 A1 | 1/2005 | Potter et al. |
| 2005/0010566 A1 | 1/2005 | Cushing et al. |
| 2005/0234957 A1 | 10/2005 | Olson et al. |
| 2005/0246357 A1 | 11/2005 | Geary et al. |
| 2005/0278139 A1 | 12/2005 | Glaenzer et al. |
| 2006/0100995 A1 | 5/2006 | Albornoz et al. |
| 2006/0117057 A1 | 6/2006 | Legault et al. |
| 2006/0129605 A1 | 6/2006 | Doshi |
| 2006/0161545 A1 | 7/2006 | Pura |
| 2006/0168002 A1 | 7/2006 | Chesley |
| 2006/0218024 A1 | 9/2006 | Lulla |
| 2006/0235837 A1 | 10/2006 | Chong et al. |
| 2007/0027904 A1 | 2/2007 | Chow et al. |
| 2007/0055662 A1 | 3/2007 | Edelman et al. |
| 2007/0139227 A1 | 6/2007 | Speirs et al. |
| 2007/0179760 A1 | 8/2007 | Smith |
| 2007/0203933 A1 | 8/2007 | Iversen et al. |
| 2007/0271604 A1 | 11/2007 | Webster et al. |
| 2007/0276875 A1 | 11/2007 | Brunswig et al. |
| 2008/0046427 A1 | 2/2008 | Lee et al. |
| 2008/0091634 A1 | 4/2008 | Seeman |
| 2008/0140609 A1 | 6/2008 | Werner et al. |
| 2008/0162550 A1 | 7/2008 | Fey |
| 2008/0162999 A1 | 7/2008 | Schlueter et al. |
| 2008/0216060 A1 | 9/2008 | Vargas |
| 2008/0240566 A1 | 10/2008 | Thint |
| 2008/0256026 A1 | 10/2008 | Hays |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0013281 A1 | 1/2009 | Helfman et al. |
| 2009/0018996 A1 | 1/2009 | Hunt et al. |
| 2009/0064053 A1 | 3/2009 | Crawford et al. |
| 2009/0094416 A1* | 4/2009 | Baeza-Yates ......... G06F 16/958 711/118 |
| 2009/0106734 A1 | 4/2009 | Riesen et al. |
| 2009/0119254 A1* | 5/2009 | Cross .................. G06F 16/9535 |
| 2009/0132474 A1 | 5/2009 | Ma et al. |
| 2009/0132503 A1 | 5/2009 | Sun et al. |

(56) References Cited

U.S. PATENT DOCUMENTS

| | | |
|---|---|---|
| 2009/0138437 A1 | 5/2009 | Krishnamoorthy et al. |
| 2009/0150313 A1 | 6/2009 | Heilper et al. |
| 2009/0157630 A1 | 6/2009 | Yuan |
| 2009/0182710 A1 | 7/2009 | Short et al. |
| 2009/0198693 A1 | 8/2009 | Pura |
| 2009/0234799 A1 | 9/2009 | Betawadkar-Norwood et al. |
| 2009/0300054 A1 | 12/2009 | Fisher et al. |
| 2010/0114885 A1 | 5/2010 | Bowers et al. |
| 2010/0138388 A1 | 6/2010 | Wakeling et al. |
| 2010/0223266 A1 | 9/2010 | Balmin et al. |
| 2010/0235384 A1 | 9/2010 | Itai et al. |
| 2010/0241644 A1 | 9/2010 | Jackson et al. |
| 2010/0250576 A1 | 9/2010 | Bowers et al. |
| 2010/0250577 A1 | 9/2010 | Cao et al. |
| 2010/0268722 A1 | 10/2010 | Yalamanchi et al. |
| 2010/0332453 A1 | 12/2010 | Prahlad et al. |
| 2011/0153047 A1 | 6/2011 | Cameron et al. |
| 2011/0202560 A1 | 8/2011 | Bowers et al. |
| 2011/0283231 A1 | 11/2011 | Richstein et al. |
| 2011/0298804 A1 | 12/2011 | Hao et al. |
| 2012/0016895 A1 | 1/2012 | Butt et al. |
| 2012/0036162 A1 | 2/2012 | Gimbel |
| 2012/0102022 A1 | 4/2012 | Miranker et al. |
| 2012/0154633 A1 | 6/2012 | Rodriguez |
| 2012/0179644 A1 | 7/2012 | Miranker |
| 2012/0254192 A1 | 10/2012 | Gelbard |
| 2012/0278902 A1 | 11/2012 | Martin et al. |
| 2012/0284301 A1 | 11/2012 | Mizrahy et al. |
| 2012/0310674 A1 | 12/2012 | Faulkner et al. |
| 2012/0330908 A1 | 12/2012 | Stowe et al. |
| 2012/0330979 A1 | 12/2012 | Elson et al. |
| 2013/0031208 A1 | 1/2013 | Linton et al. |
| 2013/0031364 A1 | 1/2013 | Glew et al. |
| 2013/0041893 A1 | 2/2013 | Strike |
| 2013/0054517 A1 | 2/2013 | Beechuk et al. |
| 2013/0110775 A1 | 5/2013 | Forsythe |
| 2013/0114645 A1 | 5/2013 | Huang et al. |
| 2013/0138681 A1 | 5/2013 | Abrams et al. |
| 2013/0156348 A1 | 6/2013 | Irani et al. |
| 2013/0238667 A1 | 9/2013 | Carvalho et al. |
| 2013/0262443 A1 | 10/2013 | Leida et al. |
| 2013/0263019 A1 | 10/2013 | Castellanos et al. |
| 2013/0321458 A1 | 12/2013 | Miserendino et al. |
| 2014/0006448 A1 | 1/2014 | McCall |
| 2014/0019426 A1 | 1/2014 | Palmer |
| 2014/0067762 A1 | 3/2014 | Carvalho |
| 2014/0115013 A1 | 4/2014 | Anderson |
| 2014/0119611 A1 | 5/2014 | Prevrhal et al. |
| 2014/0164431 A1 | 6/2014 | Tolbert |
| 2014/0198097 A1 | 7/2014 | Evans |
| 2014/0214857 A1 | 7/2014 | Srinivasan et al. |
| 2014/0229869 A1 | 8/2014 | Chiantera et al. |
| 2014/0236933 A1 | 8/2014 | Schoenbach et al. |
| 2014/0244623 A1 | 8/2014 | King |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280286 A1 | 9/2014 | Ganti et al. |
| 2014/0280287 A1 | 9/2014 | Ganti et al. |
| 2014/0337331 A1 | 11/2014 | Hassanzadeh et al. |
| 2014/0337436 A1 | 11/2014 | Hoagland et al. |
| 2014/0372434 A1 | 12/2014 | Smith et al. |
| 2015/0046547 A1 | 2/2015 | Vohra et al. |
| 2015/0052125 A1 | 2/2015 | Ellis et al. |
| 2015/0052134 A1 | 2/2015 | Bornea et al. |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0143248 A1 | 5/2015 | Beechuk et al. |
| 2015/0149879 A1 | 5/2015 | Miller et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0242867 A1 | 8/2015 | Prendergast et al. |
| 2015/0269223 A1 | 9/2015 | Miranker et al. |
| 2015/0277725 A1 | 10/2015 | Masterson et al. |
| 2015/0278273 A1 | 10/2015 | Wigington et al. |
| 2015/0278335 A1 | 10/2015 | Opitz et al. |
| 2015/0339572 A1 | 11/2015 | Achin et al. |
| 2015/0356144 A1 | 12/2015 | Chawla et al. |
| 2015/0372915 A1 | 12/2015 | Shen et al. |
| 2015/0379079 A1* | 12/2015 | Kota .................. G06F 16/24534 707/720 |
| 2016/0004820 A1 | 1/2016 | Moore |
| 2016/0012059 A1 | 1/2016 | Balmin et al. |
| 2016/0019091 A1 | 1/2016 | Leber et al. |
| 2016/0055184 A1 | 2/2016 | Fokoue-Nkoutche et al. |
| 2016/0055261 A1 | 2/2016 | Reinhardt et al. |
| 2016/0063017 A1 | 3/2016 | Bartlett et al. |
| 2016/0063271 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0092476 A1 | 3/2016 | Stojanovic et al. |
| 2016/0098418 A1 | 4/2016 | Dakshinamurthy et al. |
| 2016/0100009 A1 | 4/2016 | Zoldi et al. |
| 2016/0117358 A1 | 4/2016 | Schmid et al. |
| 2016/0117362 A1 | 4/2016 | Bagehorn et al. |
| 2016/0132572 A1 | 5/2016 | Chang et al. |
| 2016/0132608 A1 | 5/2016 | Rathod |
| 2016/0132787 A1 | 5/2016 | Drevo et al. |
| 2016/0147837 A1 | 5/2016 | Nguyen et al. |
| 2016/0162785 A1 | 6/2016 | Grobman |
| 2016/0171380 A1 | 6/2016 | Kennel et al. |
| 2016/0173338 A1 | 6/2016 | Wolting |
| 2016/0188789 A1 | 6/2016 | Kisiel et al. |
| 2016/0203196 A1 | 7/2016 | Schnall-Levin et al. |
| 2016/0232457 A1 | 8/2016 | Gray et al. |
| 2016/0275204 A1 | 9/2016 | Miranker et al. |
| 2016/0283551 A1* | 9/2016 | Fokoue-Nkoutche ...................... G06F 16/24535 |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0358102 A1 | 12/2016 | Bowers et al. |
| 2016/0358103 A1 | 12/2016 | Bowers et al. |
| 2016/0371288 A1 | 12/2016 | Biannic et al. |
| 2016/0371355 A1 | 12/2016 | Massari et al. |
| 2017/0017537 A1 | 1/2017 | Razin et al. |
| 2017/0032259 A1 | 2/2017 | Goranson et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0161341 A1 | 6/2017 | Hrabovsky et al. |
| 2017/0177729 A1 | 6/2017 | Duke et al. |
| 2017/0213004 A1 | 7/2017 | Fox et al. |
| 2017/0220615 A1 | 8/2017 | Bendig et al. |
| 2017/0220667 A1 | 8/2017 | Ghodsi et al. |
| 2017/0228405 A1 | 8/2017 | Ward et al. |
| 2017/0236060 A1 | 8/2017 | Ignatyev |
| 2017/0316070 A1 | 11/2017 | Krishnan et al. |
| 2017/0318020 A1 | 11/2017 | Kamath et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2017/0371926 A1 | 12/2017 | Shiran et al. |
| 2018/0025027 A1 | 1/2018 | Palmer |
| 2018/0025307 A1 | 1/2018 | Hui et al. |
| 2018/0032327 A1 | 2/2018 | Adami et al. |
| 2018/0040077 A1 | 2/2018 | Smith et al. |
| 2018/0046668 A1 | 2/2018 | Ghodsi et al. |
| 2018/0048536 A1 | 2/2018 | Ghodsi et al. |
| 2018/0121194 A1 | 5/2018 | Hunter et al. |

(56) References Cited

U.S. PATENT DOCUMENTS

| | | | |
|---|---|---|---|
| 2018/0210936 A1 | 7/2018 | Reynolds et al. |
| 2018/0262864 A1 | 9/2018 | Reynolds et al. |
| 2018/0300354 A1 | 10/2018 | Liang et al. |
| 2018/0300494 A1 | 10/2018 | Avidan et al. |
| 2018/0314556 A1 | 11/2018 | Ghodsi et al. |
| 2018/0314705 A1 | 11/2018 | Griffith et al. |
| 2018/0314732 A1 | 11/2018 | Armbrust et al. |
| 2018/0330111 A1 | 11/2018 | Käbisch et al. |
| 2019/0005104 A1 | 1/2019 | Prabhu et al. |
| 2019/0034491 A1 | 1/2019 | Griffith et al. |
| 2019/0042606 A1 | 2/2019 | Griffith et al. |
| 2019/0050445 A1 | 2/2019 | Griffith et al. |
| 2019/0050459 A1 | 2/2019 | Griffith et al. |
| 2019/0057107 A1 | 2/2019 | Bartlett et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0155852 A1 | 5/2019 | Miranker et al. |
| 2019/0258479 A1 | 8/2019 | Hunter et al. |
| 2019/0266155 A1 | 8/2019 | Jacob et al. |
| 2019/0272279 A1 | 9/2019 | Jacob et al. |
| 2019/0295296 A1 | 9/2019 | Gove, Jr. |
| 2019/0317961 A1 | 10/2019 | Brener et al. |
| 2019/0332606 A1 | 10/2019 | Kee et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2020/0073644 A1 | 3/2020 | Shankar et al. |
| 2020/0073865 A1 | 3/2020 | Jacob et al. |
| 2020/0074298 A1 | 3/2020 | Jacob et al. |
| 2020/0097504 A1 | 3/2020 | Sequeda et al. |
| 2020/0117665 A1 | 4/2020 | Jacob et al. |
| 2020/0117688 A1 | 4/2020 | Sequeda et al. |
| 2020/0175012 A1 | 6/2020 | Jacob et al. |
| 2020/0175013 A1 | 6/2020 | Jacob et al. |
| 2020/0201854 A1 | 6/2020 | Miller |
| 2020/0218723 A1 | 7/2020 | Jacob et al. |
| 2020/0241950 A1 | 7/2020 | Luszczak et al. |
| 2020/0252766 A1 | 8/2020 | Reynolds et al. |
| 2020/0252767 A1 | 8/2020 | Reynolds et al. |
| 2020/0257689 A1 | 8/2020 | Armbrust et al. |
| 2020/0301684 A1 | 9/2020 | Shankar et al. |
| 2020/0409768 A1 | 12/2020 | Shankar et al. |
| 2021/0011901 A1 | 1/2021 | Armbrust et al. |
| 2021/0019327 A1 | 1/2021 | Reynolds et al. |
| 2021/0042299 A1 | 2/2021 | Migliori |
| 2021/0081414 A1 | 3/2021 | Jacob et al. |
| 2021/0109629 A1 | 4/2021 | Reynolds et al. |
| 2021/0173848 A1 | 6/2021 | Jacob et al. |
| 2021/0224250 A1 | 7/2021 | Griffith |
| 2021/0224330 A1 | 7/2021 | Miranker et al. |

FOREIGN PATENT DOCUMENTS

| | | |
|---|---|---|
| EP | 2631817 A1 | 8/2013 |
| EP | 2631819 A1 | 8/2013 |
| EP | 2685394 A3 | 6/2017 |
| GB | 2519779 A | 5/2015 |
| JP | 2013175181 A | 9/2013 |
| JP | 2013246828 A | 12/2013 |
| WO | 2012054860 A1 | 4/2012 |
| WO | 2017190153 A1 | 11/2017 |
| WO | 2017222927 A1 | 12/2017 |
| WO | 2018156551 A1 | 8/2018 |
| WO | 2018164971 A1 | 9/2018 |

OTHER PUBLICATIONS

Hu, Xiaoqin, Final Office Action dated Sep. 24, 2019 for U.S. Appl. No. 15/454,981.
Hu, Xiaoqin, Non-Final Office Action dated Aug. 1, 2019 for U.S. Appl. No. 15/454,981.
Hu, Xiaoqin, Non-Final Office Action dated Jul. 26, 2019 for U.S. Appl. No. 15/454,969.
Yen, Syling, Final Office Action dated Oct. 25, 2019 for U.S. Appl. No. 15/186,519.
Yen, Syling, Non-Final Office Action dated Sep. 12, 2019 for U.S. Appl. No. 15/186,519.
Angles, R., Gutierrez. C., "The Expressive Power of SPARQL," Proceedings of the 7th International Semantic Web Conference (ISWC2008). 2008.
Arenas, M., et al., "A Direct Mapping of Relational Data to RDF," W3C Recommendation, Sep. 27, 2012, Retrieved from the Internet [retrieved Mar. 7, 2019].
Beckett, D., Berners-Lee, T., "Turtle—Terse RDF Triple Language," W3C Team Submission, Jan. 14, 2008, Retrieved from the Internet [retrieved Mar. 7, 2019].
Beckett, D., Broekstra, J., "SPARQL Query Results XML Format," W3C Recommendation, Jan. 15, 2008, Retrieved from the Internet [retrieved Mar. 7, 2019].
Beckett, Dave, "RDF/XML Syntax Specification (Revised)," W3C Recommendation, Feb. 10, 2004, Retrieved from the Internet [retrieved Mar. 7, 2019].
Berners-Lee, Tim, "Notation 3," 2006, Retrieved from the Internet [retrieved on Mar. 7, 2019].
Berners-Lee, Tim, "Linked Data," 2009, Retrieved from the Internet [retrieved on Mar. 7, 2019].
Brickley, D., Guha, R.V., "RDF Vocabulary Description Language 1.0: RDF Schema," W3C Recommendation, Feb. 10, 2004, Retrieved from the Internet [retrieved Mar. 7, 2019].
Buche et al., "Flexible SPARQL Querying of Web Data Tables Driven by an Ontology," FQAS 2009, LNAI 5822, Springer, 2009, pp. 345-357.
Bullock, Joshua, Final Office Action dated Jan. 22, 2019 for U.S. Appl. No. 15/439,908.
Bullock, Joshua, Final Office Action dated Jan. 22, 2019 for U.S. Appl. No. 15/439,911.
Bullock, Joshua, Final Office Action dated Oct. 30, 2018 for U.S. Appl. No. 15/186,517.
Bullock, Joshua, Non-Final Office Action dated Jul. 12, 2018 for U.S. Appl. No. 15/186,517.
Bullock, Joshua, Non-Final Office Action dated Jun. 28, 2018 for U.S. Appl. No. 15/439,908.
Bullock, Joshua, Non-Final Office Action dated Jun. 28, 2018 for U.S. Appl. No. 15/439,911.
Clark, K., Feigenbaum, L., Torres, E., "SPARQL Protocol for RDF," W3C Recommendation, Jan. 15, 2008, Retrieved from the Internet [retrieved Mar. 7, 2019].
Copenheaver, Blaine R., Notification of Transmittal of the International Search Report and the Written Opinion of the International Searching Authority, or the Declaration dated Jul. 5, 2017 for International Patent Application No. PCT/US2017/030474.
Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "OWL Web Ontology Language Reference," W3C Recommendation, Feb. 10, 2004, Retrieved from the Internet [retrieved Mar. 7, 2019].
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I., Kesselman, C., Nick, J., Tuecke, S., "The Physiology of the Grid: An Open Grid Services Architecture for Distributed

(56) References Cited

OTHER PUBLICATIONS

Systems Integration," Technical Report, Global Grid Forum (2002).
Ganti et al., U.S. Appl. No. 14/058,184, filed Oct. 18, 2013 and entitled, "Assisted Query Formation, Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,206, filed Oct. 18, 2013 and entitled, "Curated Answers Community Automatically Populated Through User Query Monitoring."
Ganti et al., U.S. Appl. No. 14/058,208, filed Oct. 18, 2013 and entitled, "Editable and Searchable Markup Pages Automatically Populated Through User Query Monitoring."
Ganti et al., U.S. Appl. No. 61/802,716, filed Mar. 17, 2013 and entitled, "Data Profile Driven Query Builder."
Ganti et al., U.S. Appl. No. 61/802,742, filed Mar. 18, 2013 and entitled, "Developing a Social Data Catalog By Crowd-Sourcing."
Ganti et al., U.S. Appl. No. 61/802,743, filed Mar. 18, 2013 and entitled, "Creating a Data Catalog By Mining Queries."
Ganti et al., U.S. Appl. No. 61/802,744, filed Mar. 18, 2013 and entitled, "Auto-Completion of Queries With Data Object Names and Data Profiles."
Garcia-Molina, H., Ullman, J., Widom, J., Database Systems: The Complete Book. Editorial Pearson Prentice Hall. Second Edition.
Gawinecki, Maciej, "How schema mapping can help in data integration?—integrating the relational databases with ontologies," ITC School, Computer Science, XXIII Cycle DII, University of Modena and Reggio Emilia, Italy, 2008.
Girma, Anteneh B., Final Office Action for U.S. Appl. No. 13/278,907, dated Apr. 18, 2013.
Girma, Anteneh B., Non-Final Office Action for U.S. Appl. No. 13/278,907, dated Jul. 25, 2012.
Grant, J., Beckett, D., "RDF Test Cases," W3C Recommendation, Feb. 10, 2004, Retrieved from the Internet [retrieved Mar. 7, 2019].
Haveliwala et al., "Evaluating Strategies for Similarity Search on the Web," Proceedings of the 11th international conference on World Wide Web, May 7-11, 2002, Honolulu, Hawaii, USA (ACM), p. 432-442.
Hayes, Patrick, "RDF Semantics," W3C Recommendation, Feb. 10, 2004, Retrieved from the Internet [retrieved Mar. 7, 2019].
Heflin, J., "OWL Web Ontology Language Use Cases and Requirements," W3C Recommendation, Feb. 10, 2004, Retrieved from the Internet [retrieved Mar. 7, 2019].
Hoang, Hau Hai, Final Office Action dated Nov. 26, 2018 for U.S. Appl. No. 15/186,515.
Hoang, Hau Hai, Non-Final Office Action dated Apr. 16, 2019 for U.S. Appl. No. 15/186,515.
Hoang, Hau Hai, Non-Final Office Action dated May 3, 2018 for U.S. Appl. No. 15/186,515.
Htay, Lin Lin M., Non-Final Office Action dated Sep. 14, 2018 for U.S. Appl. No. 15/186,516.
Htay, Lin Lin M., Notice of Allowance and Fee(s) Due and Notice of Allowability for U.S. Appl. No. 15/186,516, dated Jan. 25, 2019.
Hu, Xiaoqin, Final Office Action dated Apr. 5, 2019 for U.S. Appl. No. 15/454,969.
Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.
Khong, Alexander, Non-Final Office Action for U.S. Appl. No. 15/165,775, dated Jun. 14, 2018.
Klyne, G., Carroll, J., "Resource Description Framework (RDF): Concepts and Abstract Syntax," W3C Recommendation, Feb. 10, 2004, Retrieved from the Internet [retrieved Mar. 7, 2019].
Krishnan et al., U.S. Appl. No. 15/583,966, filed May 1, 2017 and titled "Automatic Generation of Structured Data from Semi-Structured Data."
Langedgger, Andreas, "XL Wrap—Spreadsheet-to-RDF Wrapper," 2009, Retrieved from the Internet [retrieved Mar. 7, 2019].

Lee, Mark B., Non-Final Office Action for U.S. Appl. No. 13/180,444 dated Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet [retrieved Mar. 7, 2019].
Martin et al., U.S. Appl. No. 13/457,925, filed Apr. 27, 2012 and titled "Incremental Deployment of Computer Software Program Logic."
Martin et al., U.S. Appl. No. 61/479,621, filed Apr. 27, 2011 and titled "Incremental Deployment of Computer Software Program Logic."
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "OWL Web Ontology Language Overview," W3C Recommendation, Feb. 10, 2004, Retrieved from the Internet [retrieved Mar. 7, 2019].
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet [retrieved Mar. 7, 2019].
Nguyen, Kim T., Non-Final Office Action dated Jun. 14, 2018 for U.S. Appl. No. 15/186,514.
Nguyen, Kim T., Non-Final Office Action dated Mar. 20, 2019 for U.S. Appl. No. 15/454,923.
Niinimaki et al., "An ETL Process for OLAP Using RDF/OWL Ontologies," Journal on Data Semantics XIII, LNCS 5530, Springer, pp. 97-119, Aug. 12, 2009.
Pandit et al., "Using Ontology Design Patterns To Define SHACL Shapes," CEUR Workshop Proceedings, Proceedings of the 9th Workshop on Ontology Design and Patterns (WOP 2018), Monterey, USA, Oct. 9, 2018.
Parashar et al., U.S. Appl. No. 62/329,982, filed Apr. 29, 2016 and titled "Automatic Parsing of Semi-Structured Data and Identification of Missing Delimiters."
Patel-Schneider, P., Hayes, P., Horrocks, I., "OWL Web Ontology Language Semantics and Abstract Syntax," W3C Recommendation, Feb. 10, 2004, Retrieved from the Internet [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet [retrieved Mar. 7, 2019].
Raab, Christopher J., Non-Final Office Action dated Jun. 28, 2018 for U.S. Appl. No. 15/186,520.
Raab, Christopher J., Notice of Allowance and Fee(s) Due and Notice of Allowability for U.S. Appl. No. 15/186,520, dated Jan. 2, 2019.
RDB2RDF Working Group Charter, Sep. 2009, Retrieved from the Internet [retrieved Mar. 7, 2019].
Sahoo, S., et al., "A Survey of Current Approaches for Mapping of Relational Databases to RDF," W3C RDB2RDF XG Report, Incubator Group, Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.
Sequeda, J., et al., "Direct Mapping SQL Databases to the Semantic Web," Technical Report 09-04. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.
Sequeda, J., Tirmizi, S., Miranker, D., "SQL Databases are a Moving Target," Position Paper for W3C Workshop on RDF Access to Relational Databases, Cambridge, MA, USA, 2007.

(56) References Cited

OTHER PUBLICATIONS

Skevakis, Giannis et al., Metadata management, interoperability and Linked Data publishing support for Natural History Museums, Int J Digit Libr (2014), published online: Apr. 11, 2014; Springer-Verlag Berlin Heidelberg.
Smith, M., Welty, C., McGuiness, D., "OWL Web Ontology Language Guide," W3C Recommendation, Feb. 10, 2004, Retrieved from the Internet [retrieved Mar. 7, 2019].
Smith, T.F., Waterman, M.S., "Identification of Common Molecular Subsequences," J. Mol. Biol. 147, 195-197 (1981).
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.
U.S. Appl. No. 16/251,408, filed Jan. 18, 2019.
Ultrawrap Mapper, U.S. Appl. No. 62/169,268, filed Jun. 1, 2015 (Expired).
Vy, Hung T., Final Office Action for U.S. Appl. No. 13/180,444 dated Dec. 3, 2014.
Vy, Hung T., Final Office Action for U.S. Appl. No. 13/180,444 dated Dec. 9, 2015.
Vy, Hung T., Final Office Action for U.S. Appl. No. 13/180,444 dated Feb. 22, 2013.
Vy, Hung T., Non-Final Office Action for U.S. Appl. No. 13/180,444 dated Jun. 18, 2015.
Vy, Hung T., Non-Final Office Action for U.S. Appl. No. 13/180,444 dated Mar. 26, 2014.
Vy, Hung T., Non-Final Office Action for U.S. Appl. No. 15/273,930 dated Dec. 20, 2017.
Yen, Syling, Final Office Action dated Apr. 10, 2019 for U.S. Appl. No. 15/186,519.
Hu, Xiaoqin, Final Office Action dated Apr. 5, 2019 for U.S. Appl. No. 15/454,981.
Hu, Xiaoqin, Non-Final Office Action for U.S. Appl. No. 15/454,969 dated Dec. 7, 2018.
Hu, Xiaoqin, Non-Final Office Action for U.S. Appl. No. 15/454,981 dated Dec. 12, 2018.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Joshi, Amit Krishna et al., "Alignment-based Querying of Linked Open Data," Lecture Notes in Computer Science, 7566, 807-824, 2012.
Yen, Syling, Non-Final Office Action dated Feb. 8, 2019 for U.S. Appl. No. 15/186,519.
Young, Lee W., International Searching Authority, Notification of Transmittal of the International Search Report and the Written Opinion of the International Searching Authority, or the Declaration for International Patent Application No. PCT/US2017/037846, dated Nov. 9, 2017.
Young, Lee W., International Searching Authority, Notification of Transmittal of the International Search Report and the Written Opinion of the International Searching Authority, or the Declaration for International Patent Application No. PCT/US2018/020812, dated Aug. 8, 2018.
Young, Lee W., Invitation to Pay Additional Fees And, Where Applicable, Protest Fee, dated Jun. 14, 2018 for International Application No. PCT/US2018/020812.
Young, Lee W., Notification of Transmittal of the International Search Report and the Written Opinion of the International Searching Authority, or the Declaration dated May 29, 2018 for International Patent Application No. PCT/US2018/018906.
Young, Lee W., Notification of Transmittal of the International Search Report and the Written Opinion of the International Searching Authority, or the Declaration for International Application No. PCT/US2011/057334, dated Mar. 22, 2012.
"Data.World Comes Out Of Stealth To Make Open Data Easier." Americaninno.com, AustinInno, Jul. 11, 2016, www.americaninno.com/austin/open-data-tech-brett-hurts-startup-data-world-launches/.
Dwivedi, Mahesh H., Non-Final Office Action dated Jan. 30, 2020 for U.S. Appl. No. 15/454,955.
Gillin, Paul, "Neo4j Connector Integrates Graph Data With Business Intelligence Tools," SiliconANGLE, Published Mar. 24, 2020, Retrieved from on Mar. 25, 2020.
Yotova, Polina, Supplementary European Search Report and Examiner Search Opinion for European Patent Application No. 17815970.3, dated Feb. 21, 2020.
Alaoui et al., "SQL to SPARQL Mapping for RDF querying based on a new Efficient Schema Conversion Technique," International Journal of Engineering Research & Technology (IJERT); ISSN: 2278-0181; vol. 4 Issue 10, Oct. 1, 2015, Retrieved from internet: https://www.ijert.org/research/sql-to-sparql-mapping-for-rdf-querying-based-on-a-new-efficient-schema-conversion-technique-IJERTV4IS1--1-5.pdf. Retrieved on Oct. 6, 2020.
Doung, Hien, Non-Final Office Action dated Dec. 9, 2020 for U.S. Appl. No. 16/899,544.
Ellis, Matthew J., Non-Final Office Action dated Sep. 25, 2020 for U.S. Appl. No. 16/139,374.
European Patent Office, Extended European Search Report for European Patent Application No. 18757122.9 dated Oct. 15, 2020.
European Patent Office, Extended European Search Report for European Patent Application No. 18763855.6 dated Sep. 28, 2020.
Garay, Peter, Examination Report No. 1 for Standard Patent Application for Australia Patent Application No. 2017282656 dated Jul. 21, 2021, Intellectual Property Office of Australia.
Hoang, Hau Hai, Notice of Allowance and Fee(s) Due dated Aug. 19, 2021 for U.S. Appl. No. 16/697,132.
Hu, Xiaoqin, Non-Final Office Action dated Jul. 30, 2021 for U.S. Patent Application No.
Hu, Xiaoqin, Non-Final Office Action dated Sep. 2, 2021 for U.S. Appl. No. 16/732,263.
Nguyen, Bao-Yen Thi, Restriction Requirement dated Jun. 29, 2021 for Design U.S. Appl. No. 29/648,466.
Nguyen, Kim T., Non-Final Office Action dated Aug. 31, 2021 for U.S. Appl. No. 16/899,549.
Nguyen, Kim T., Non-Final Office Action dated Dec. 10, 2020 for U.S. Appl. No. 16/137,297.
Nguyen, Kim T., Non-Final Office Action dated Dec. 8, 2020 for U.S. Appl. No. 15/985,704.
Nguyen, Kim T., Non-Final Office Action dated Jun. 7, 2021 for U.S. Appl. No. 16/457,766.
Nguyen, Kim T., Non-Final Office Action dated May 11, 2021 for U.S. Appl. No. 16/395,036.
Nguyen, Kim T., Non-Final Office Action dated Nov. 24, 2020 for U.S. Appl. No. 16/036,834.
Nguyen, Kim T., Non-Final Office Action dated Nov. 24, 2020 for U.S. Appl. No. 16/036,836.
Nguyen, Kim T., Non-Final Office Action dated Nov. 27, 2020 for U.S. Appl. No. 15/985,705.
Nguyen, Kim T., Non-Final Office Action dated Oct. 14, 2020 for U.S. Appl. No. 15/943,629.
Nguyen, Kim T., Non-Final Office Action dated Oct. 14, 2020 for U.S. Appl. No. 15/943,633.
Nguyen, Kim T., Non-Final Office Action dated Oct. 27, 2020 for U.S. Appl. No. 15/985,702.
Nguyen, Kim T., Non-Final Office Action dated Oct. 5, 2020 for U.S. Appl. No. 15/927,004.
Nguyen, Kim T., Non-Final Office Action dated Oct. 5, 2020 for U.S. Appl. No. 15/927,006.
Nguyen, Kim T., Non-Final Office Action dated Sep. 21, 2020 for U.S. Appl. No. 15/926,999.
Nguyen, Kim T., Notice of Allowance and Fee(s) Due dated Aug. 17, 2021 for U.S. Appl. No. 16/428,915.
Nguyen, Kim T., Notice of Allowance and Fee(s) Due dated Aug. 3, 2021 for U.S. Appl. No. 16/457,766.
Nguyen, Kim T., Notice of Allowance and Fee(s) Due dated Mar. 16, 2021 for U.S. Appl. No. 15/985,702.
Nguyen, Kim T., Notice of Allowance and Fee(s) Due dated Mar. 16, 2021 for U.S. Appl. No. 16/137,297.
Nguyen, Kim T., Notice of Allowance and Fee(s) Due dated Mar. 17, 2021 for U.S. Appl. No. 15/985,704.

(56) References Cited

OTHER PUBLICATIONS

Nguyen, Kim T., Notice of Allowance and Fee(s) Due dated Mar. 31, 2021 for U.S. Appl. No. 15/985,705.
Raab, Christopher J., Non-Final Office Action dated Jul. 24, 2020 for U.S. Appl. No. 16/271,687.
Raab, Christopher J., Non-Final Office Action dated Oct. 16, 2020 for U.S. Appl. No. 16/287,967.
Rachapalli et al., "RETRO: A Framework for Semantics Preserving SQL-to-SPARQL Translation," The University of Texas at Dallas; Sep. 18, 2011, XP055737294, Retrieved from internet: http://iswc2011.semanticweb.org/fileadmin/iswc/Papers/Workshope/EvoDyn/evodyn_3.pdf. Retrieved on Oct. 6, 2020.
Spieler, William, Final Office Action dated Mar. 15, 2021 for U.S. Appl. No. 16/435,196.
Spieler, William, Non-Final Office Action dated Dec. 31, 2020 for U.S. Appl. No. 16/435,196.
Spieler, William, Non-Final Office Action dated Feb. 25, 2021 for U.S. Appl. No. 16/558,076.
Spieler, William, Non-Final Office Action dated Jul. 9, 2021 for U.S. Appl. No. 16/435,196.
Woo, Isaac M., Non-Final Office Action dated May 5, 2020 for U.S. Appl. No. 16/137,292.

\* cited by examiner

CONTENT ADDRESSABLE CACHING AND FEDERATION IN LINKED DATA PROJECTS IN A DATA-DRIVEN COLLABORATIVE DATASET PLATFORM USING DISPARATE DATABASE ARCHITECTURES

CROSS-REFERENCE TO APPLICATIONS

This application is a continuation-in-part application of U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS," and this application is also a continuation-in-part application of U.S. patent application Ser. No. 15/985,702, filed on May 22, 2018, and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS," all of which are herein incorporated by reference in their entirety for all purposes.

FIELD

Various embodiments relate generally to data science and data analysis, computer software and systems, and wired and wireless network communications to interface among repositories of disparate datasets and computing machine-based entities configured to access datasets, and, more specifically, to a computing and data storage platform to implement computerized tools to facilitate expedited queries based on query results generated by disparate computing and database architectures, according to at least some examples.

BACKGROUND

Advances in computing hardware and software have fueled exponential growth in the generation of vast amounts of data due to increased computations and analyses in numerous areas, such as in the various scientific and engineering disciplines, as well as in the application of data science techniques to endeavors of good-will (e.g., areas of humanitarian, environmental, medical, social, etc.). Also, advances in conventional data storage technologies provide an ability to store an increasing amount of generated data. Consequently, traditional data storage and computing technologies have given rise to a phenomenon in which numerous desperate datasets have reached sizes and complexities that tradition data-accessing and analytic techniques are generally not well-suited for assessing conventional datasets.

Conventional technologies for implementing datasets typically rely on different computing platforms and systems, different database technologies, and different data formats, such as CSV, TSV, HTML, JSON, XML, etc. Known data-distributing technologies are not well-suited to enable interoperability among datasets. Thus, many typical datasets are warehoused in conventional data stores, which are known as "data silos." These data silos have inherent barriers that insulate and isolate datasets. Further, conventional data systems and dataset accessing techniques are generally incompatible or inadequate to facilitate data interoperability among the data silos. Various, ad hoc and non-standard approaches have been adopted, but each standard approach is driven by different data practitioners each of whom favor a different, personalized process.

As graph-based data structures grow at increasing rates (e.g., at arithmetical or exponential rates), the complexity with which to match data between a newly-uploaded dataset and previously-uploaded datasets increases correspondingly. Typically, datasets of various types of formats, such as CSV, TSV, HTML, JSON, XML, etc., require additional processing, including manual intervention, to identify related datasets that may be disposed, for example, in graph-based data arrangements. For instance, some conventional data formats are designed for relational database architectures, which generally known for being difficult to scale as data and related datasets increase in size. As such, relational databases of large sizes are not well-suited for expeditiously identifying classes or types of data over large-scaled data arrangements with which to join a newly-added dataset.

Furthermore, traditional approaches in generating queries applied over conventional disparate data sources (e.g., different computing platforms and systems, different database technologies, and different data formats) typically require data transformation among the various different data sources to generate results based on data from the conventional data sources. Typically, a query on data in the conventional disparate data sources may refer to a set of architecture-specific queries, which are to be executed individually against specific database technologies and formats at the time the principal query is performed. Therefore, multiple architecture-specific queries may be executed responsive to execution of the principal query, thereby consuming computational resources. In some approaches, an update to an architecture-specific query and its results upon which the principal query interrelates can cause cascading of any query that may rely on the updated data, which, if performed at time of the principal query would impede or slow down determination of the query results due to the cascaded architecture-specific queries. The detrimental effects become more pronounced as the complexity and number of multiple architecture-specific queries are interrelated to generate results for the principal query. In this case, computational resources can be consumed irrespective of execution of the principal query and other computational priorities. Such approaches can be viewed (or analogized) as early or static binding that is performed irrespective of execution or run-time or execution of a principal query.

Thus, what is needed is a solution for facilitating techniques to optimize data operations applied to querying datasets, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1:
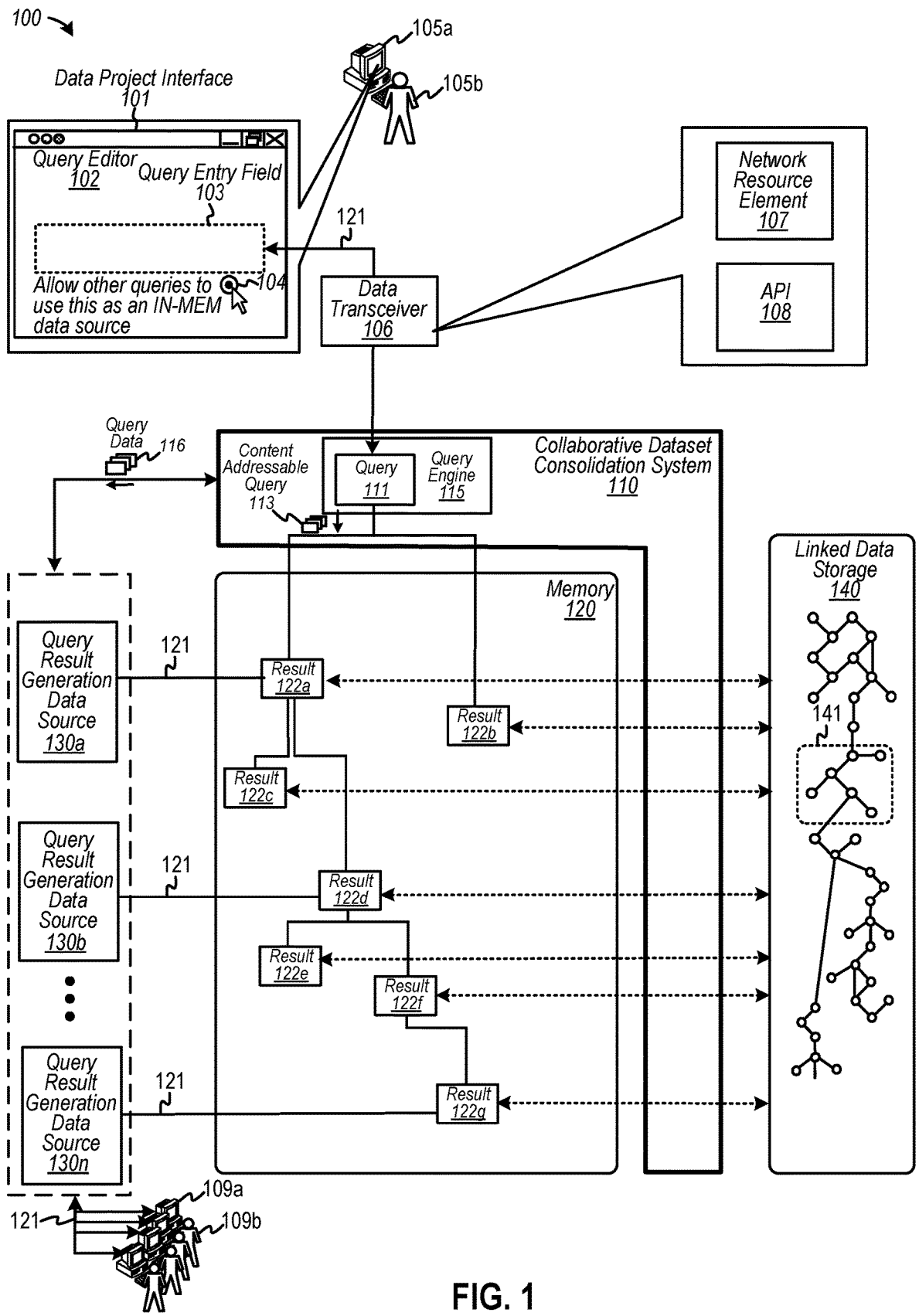
FIG. 1 is an example of a query engine configured to generate and implement content addressable query results, according to some examples.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures configured to store data in various computer programming languages and formats in accordance with various types of structured and unstructured database schemas such as SQL, MySQL, NoSQL, DynamoDB™, or "dwSQL" which has been developed by data.world, Inc., of Austin, Tex., U.S.A. Also applicable are computer programming languages and formats similar or equivalent to those developed by data facility and computing providers such as Amazon® Web Services, Inc. of Seattle, Wash., FMP, Oracle®, Salesforce.com, Inc., or others, without limitation or restriction to any particular instance or implementation. Further, references to databases, data structures, or any type of data storage facility may include any embodiment as a local, remote, distributed, networked, cloud-based, or combined implementation thereof. For example, social networks and social media (hereafter "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering, content sharing, or like purposes. Data may be generated in various formats such as text, audio, video (including three dimensional, augmented reality ("AR"), and virtual reality ("VR"), or others, without limitation, for use on social networks, social media, and social applications (hereafter "social media") such as Twitter® of San Francisco, Calif., Snapchat® as developed by Snap® of Venice, Calif., Messenger as developed by Facebook®, WhatsApp®, or Instagram® of Menlo Park, Calif., Pinterest® of San Francisco, Calif., LinkedIn® of Mountain View, Calif., and others, without limitation or restriction. In some examples, data may be formatted and transmitted (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Presto™, including SQL query engine applications, Apache Hive™, middleware developed by Capsenta™ of Austin, Tex., U.S.A., among others. References to various layers of an application architecture (e.g., application layer or data layer) may refer to a stacked layer application architecture such as the Open Systems Interconnect ("OSI") model or others.

FIG. 1 is an example of a query engine configured to generate and implement content addressable query results, according to some examples. Diagram 100 includes a data project interface 101 that includes an example of a query editor 102 configured to cause implementation of a content addressable query 113. Diagram 100 also includes a collaborative dataset consolidation system 110 in electronic data communication with a memory 120 and a linked data storage 140. Collaborative dataset consolidation system 110 may include a query engine 115 and any number of structures and/or functionalities (not shown) described or incorporated herein. Collaborative dataset consolidation system 110 and/or query engine 115 are configured to generate a query 111 based on data representing query results, such as query results ("results") 122a to 122g.

One or more of query results 122a to 122g may be generated at one or more of query result generation data sources 130a, 130b, and 130n, which can include any number of query result generation data sources accessible via one or more network data communication links 121 (e.g., via one or more networks, including the Internet, cloud-based networks, etc.). One or more subsets of query result generation data sources 130a, 130b, and 130n (some of which are not shown) may include a particular computing platforms and systems, database technologies, and/or data formats (e.g., query data formats), whereby multiples subsets of query result generation data sources 130a, 130b, and 130n may be disparate. For example, query result generation data sources 130a, 130b, and 130n may include one or more different computing platforms and systems, one or more different database technologies, and/or one or more different data formats. In some examples, at least one query result generation data source may be referred to as a back-end architecture, which may include a computing device (e.g., a server) or an application, or both.

According to some examples, query result generation data sources 130a, 130b, and 130n are configured to generate query results that may be disposed or stored in memory 120. For example, query result generation data source 130a may generate, responsive to a query, query results 122a that may be stored in memory 120. Similarly, query result generation data sources 130b and 130n may generate query results 122d and 122n, respectively, responsive to corresponding queries, that also may be stored in memory 120. Query result generation data sources 130a, 130b, and 130n, or other query result generation data sources (not shown), may be configured to generate query results responsive to other queries, whereby the query results may be transmitted to, or otherwise stored in, in memory 120 as results 122b, 122c, 122e, and 122f, among other optional query results (not shown). In the example shown, query results 122a to 122g are depicted as having various levels of interdependency. For example, query result 122f includes result data derived from or depending on query result 122g, whereas query result 122d may include result data associated with query results 122e and 122f. Further, query result 122a may include result data associated with query results 122c and 122d. In turn, query 111 initiated at query editor 102 may be directed to generate query results based on query results 122a and 122b.

The queries that may be applied to query result generation data sources 130a, 130b, and 130n may be generated from a variety of sources. For example, a query that causes storing of any query results 122a to 122g may be generated from any of computing devices 109a, each of which may be associated with a user 109b or a user account configured to include data authorizing access to any of query result generation data sources 130a, 130b, and 130n. Alternatively, a query ("query data") 116 that may cause any of query results 122a to 122g to be stored in memory 120 may originate at a computing device 105a, which may be associated with the user 105b or a user account configured to employ data project interface 101. According to some examples, each of query results 122a to 122g may be stored in memory 120 in any data format, and each of query results 122a to 122g may be stored (e.g., via replication) in a graph-data format (e.g., RDF or equivalent) in a data repository, such as linked data storage 140. For example, any of query results 122a to 122g may be associated with a portion of a graph data arrangement, such as portion 141, stored in linked data storage 140. Therefore, regardless of a data format in which one or more of query results 122a to 122g may be stored, each of query results 122a to 122g may have data stored in a graph data arrangement or may have data that may be viewed as a graph data though the actual data may be stored in any data arrangement, including formats other than graph-based data formats. Associated portion 141 for a graph data arrangement may be translated or virtualized into a graph-based data format with references to data stored in at least one of query results 122a to 122g, according to some examples.

According to various examples, query engine 115 may be configured to receive data representing a query 111, which may be input into query entry field 103 and transmitted via network data link 121. In some implementations, query engine 115 may be configured to generate query data 116 to access query result generation data sources 130a, 130b, and 130n to retrieve query results 122a to 122g, any of which may be stored in memory 120. In at least one example, query data 116 may cause one or more query result generation data sources 130a, 130b, and 130n to "seed" or cause progeneration of an implementation of one or more query results 122a to 122g, which may reside in memory 120, for access by query 111.

According to at least one embodiment, query engine 115 may be configured to detect whether one or more query results 122a to 122g may be disposed in memory 120. In some examples, query engine 115 can determine one or more query results 122a to 122g based on, for example, data references (e.g., pointers) that may interrelate query results 122a to 122g for extracting data to form a query result. In one or more alternative examples, query engine 115 may generate content addressable query data 113 to identify one or more query results 122a to 122g for generating a query result, based on query 111, to return to query results to data project interface 101. Content addressable query data 113 may include data configured to detect, based on query 111, relevant query results that may reside in one or more query results 122a to 122g. For example, query engine 115 may generate data representing content addressable query data 113 to match at least a portion of data or content disposed in, and federated over, query results 122a to 122g in memory 120 for purposes of retrieving a query result as relevant to query 111.

According to at least one example, query result generation data source 130a may be implemented as a back-end architecture configured to store data (e.g., datasets) in graph-based data format (e.g., RDF), such as in a triplestore. Examples of triplestores suitable to store "triples" and atomized datasets (or portions thereof) include, but are not limited to, any triplestore type architected to function as (or similar to) a BLAZEGRAPH triplestore, which is developed by Systap, LLC of Washington, D.C., U.S.A.), any triplestore type architected to function as (or similar to) a STARDOG triplestore, which is developed by Complexible, Inc. of Washington, D.C., U.S.A.), any triplestore type architected to function as (or similar to) a FUSEKI triplestore, which may be maintained by The Apache Software Foundation of Forest Hill, Md., U.S.A.), and the like. In some examples, linked data storage 140 may be configured to store atomized data or "triples" in any of the aforementioned triplestores.

Further, query result generation data source 130a may also be configured to implement any suitable data file formats for implementing graph-based data formats, including compressed graph-based data files or data streams. In one example, a graph-based data format may include an RDF file format, such as a binary RDF file format that may be compressed and encoded as a binary data file or stream. An example of a suitable binary RDF file format is an RDF HDT ("Header-Dictionary-Triples"), which is maintained by the World Wide Web Consortium ("W3C"). Query result generation data source 130a may include an application or a program module configured to implement an HDT data processor, which may be implemented in either software or hardware, or both. An HDT data processor may be configured to encode RDF data into HDT data and/or to decode HDT data into RDF data. In some examples, encoded HDT data may be exchanged via link 121 between query result generation data source 130a and memory 120 at which a query result 122a may be stored. As HDT is a compact binary version of data representing graph data, HDT data may be transmitted and exchanged via, for example, data links 121, to adapt to larger amounts data, thereby enabling query engine 115 to receive query result more quickly to scale with corresponding amounts of data.

According to another example, query result generation data source 130b may be implemented as a back-end architecture including a Presto™ query engine (e.g., an SQL query engine) developed by Facebook® of Menlo Park, Calif. Presto executes instructions in accordance with, for example, Java programming language and may interoperate with other applications and storage technologies, including Hadoop®. A Presto query engine may be a distributed query engine (e.g., query functionalities may be distributed to "worker" query processes) configured to combine data from multiple data sources (e.g., relational database technologies), such as Hadoop Distributed File System ("HDFS"), MySQL, Amazon S3™, Apache™ Kafka or Cassandra, and as well as data streaming technologies or other data storage technologies, such as relational databases. Thus, query result generation data source 130b may include a Presto query engine configured to query data where it is stored (e.g., data residing in a relatively large data storage repository and/or database).

According to various examples, a Presto query engine can generate results compatible with a variety of formats, such as a text format, Apache Avro™, RCFile, and the like. In at least one example, a Presto query engine be configured to generate a query result in a Parquet™ data file format, which may include compressed data representations based on columnar storage data formats. Queries may generate results formatted such that queries on columnar values may apply to a common type (e.g., data type), thereby omitting rowwise data values. The may preserve data storage space and enhance performance.

According to yet another example, query result generation data source 130n may be implemented as a back-end architecture including a computing device implementing an application equivalent to an application developed by Capsenta, Inc., of Austin, Tex. The application may include logic referred to as Ultrawrap™ software, whereby its logic may be configured to transform or map a relational database (e.g., an RDBMS) to form a virtualized graph data representation of the relational database. Consequently, data can be maintained in the relational database without replicating data to other databases or data storage devices (e.g., triplestores) while facilitating graph-directed queries (e.g., via SPARQL) using the virtualized graph data. Hence, query result generation data source 130n may generate query results in a graph-based format via virtualized graph data including data residing in a relational database.

In view of the foregoing, one or more structures and/or one or more functionalities described in FIG. 1 (or anywhere herein) may be configured to expeditiously identify relevant data of a query, such as query 111, based on data representing content of one or more query results upon which the query is based. So, query engine 115 can decompose or distill query 111 to identify specific query portions that may be associated with corresponding query results, any of which may be disposed in one or more query results 122a to 122g. According to some examples, query engine 115 may be configured to receive a query 111 and generate content addressable query data 113 to identify and access relevant query results from one or more query results 122a to 122g in memory 120.

By accessing query results store in memory, one or more queries results may be accessed expeditiously. For example, one or more query results 122a to 122g need not necessitate execution of queries (e.g., a SQL query or other queries) at one or more query result generation data sources 130a, 130b, and 130n. Therefore, queries that may be performed at one or more points in time to generate one or more query results 122a to 122g need not be performed to provide query results (e.g., responsive to queries generated at computing devices 109a or 105a) in some examples. According to at least one example, query engine 115 may be configured to detect whether any of the data associated with results 122a to 122g has changed and to form query results, responsive to query 111, without performing or executing queries associated with query result generation data sources 130a to 130n. In one example, query results 122a to 122g may be disposed in memory 120 (e.g., cache memory), such as on-board CPU cache, such as an L1 cache, or other inmemory cache memory, such as L2, L3 or system memory, among others. Storing query results 122a to 122g in memory 120 can enhance speeds of determining results of query 111 as query engine 115 need not access data externally or at locations associated with delays in computations that may result. Accesses to cache memories, at least in one example, may be expeditious relative to accesses to databases or data storage (e.g., networked or otherwise). For example, a metric expressed in a number of input/output operations per second ("TOPS") when implementing memory 120 may be enhanced relative to (and exceed) at least networked and database retrieved data representing query results.

According to some examples, query engine 115 may determine that one or more query results 122a to 122g are quiescent. In some cases, a quiescent data value may be a non-transient data value (e.g., static data during a period of time in which query results need not change or need not be updated). In other cases, a quiescent data value may be a data value associated with a non-changing data value or a data value that may be within a range of values (e.g., within a range of values that may vary within a set of values). In some examples, query engine 115 may be configured to detect that at least one of query results 122a to 122g includes a transient data value, which may indicate variant data relative to a query. According to some examples, query engine 115 may implement content addressable query data 113 to detect quiescent data values associated with query values stored as query results 122a to 122g, and to perform a query on those quiescent data values. By detecting quiescent data values in query results 122a to 122g, corresponding queries need not be performed (e.g., need not be executed in query result generation data sources 130a, 130b, and 130n). Thus, computational resources may be preserved. Further, complexity of computing and re-computing each of queries (e.g., interrelated query results) in view of query result generation data sources 130a, 130b, and 130n may be omitted. Thus, query results for query 111 may be determined dynamically, similar to "late binding" of data queries (rather than 'early' binding), and, as such, data for a query 111 need not be dependent on ingested data (e.g., data ingestion may be omitted to form query results).

According to some examples, a data transceiver 106 may be configured to perform one or more functionalities described herein, whereby data transceiver 106 may include hardware or software, or a combination thereof, that may be implemented as a network resource element 107, such as a server, a router, or any other computing device, including, but not limited to, a computing device at an Internet service provider ("ISP"). Network resource element 107 may also be implemented as a computing device 105a or any computing device 109a. Alternatively, data transceiver 106 may be implemented as an applications programming interface ("API") 108, disposed at computing device 105a or at a computing device implementing collaborative dataset consolidation system 110, or any combination thereof.

In one example, data project interface 101 may be configured to generate and present a user input 104, whereby, if selected, query results generated in response to initiating of query via query entry field 103 may be accessible or available to other users. For example, a query result based on query 111 may include data representing query results 122a to 122g, and the query result may be accessible (responsive to activation of input 104) for other users to store in corresponding cache memories. In some examples, activation of input 104 may generate data representing a permission to implement a result of a query as a dataset for other users.

Figure 2:
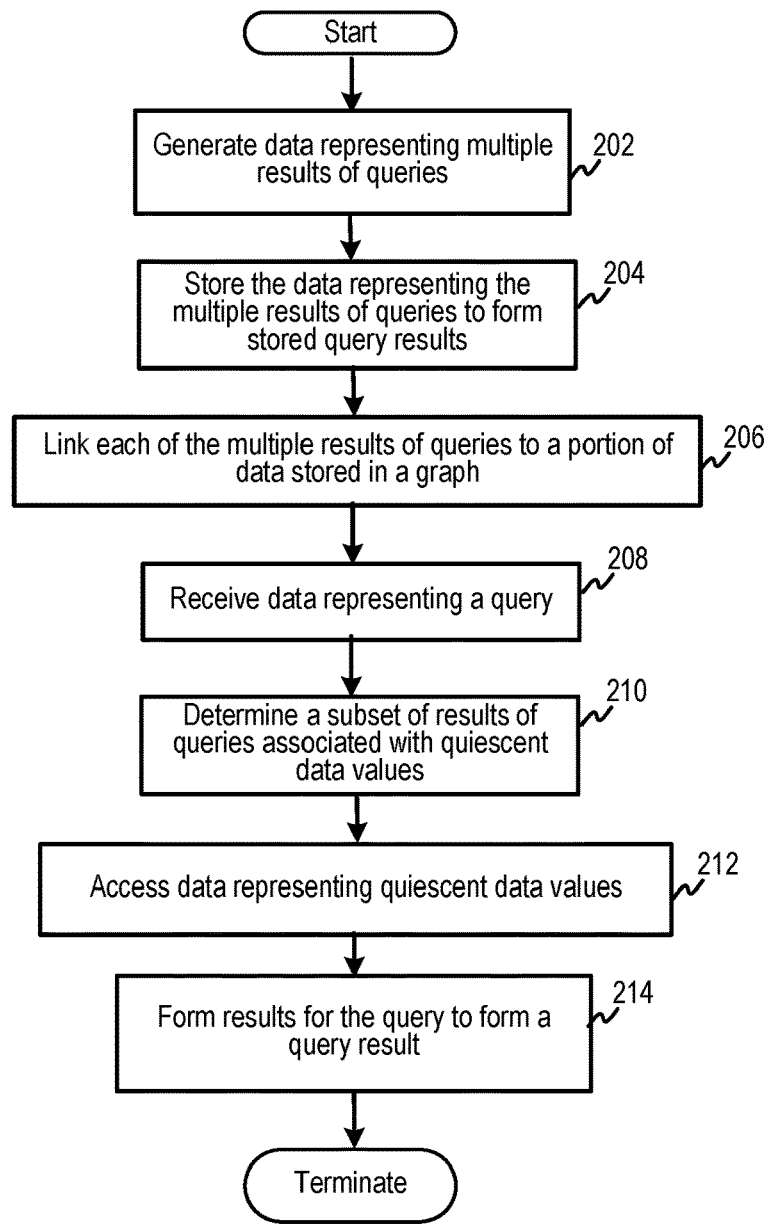
FIG. 2 is a flow diagram depicting an example of implementing a subset of query results generated via different computing and data storage architectures to execute a query, according to some embodiments.

FIG. 2 is a flow diagram depicting an example of implementing a subset of query results generated via different computing and data storage architectures to execute a query, according to some embodiments. Flow diagram 200 may be implemented in association with a computing platform, such as a collaborative dataset consolidation system. An example of a collaborative dataset consolidation system has been developed by data.world, Inc., of Austin, Tex. Further, flow diagram 200 may be facilitated via computerized tools including a data project interface (e.g., a user interface 101 of FIG. 1), which may be configured to initiate and/or execute instructions to identify content addressable query result data cached in memory.

Flow 200 describes one or more functionalities and/or subprocesses to generate query results based on cached query result data for presentation in a user interface. The query results may be presented via a user interface in a tabular data arrangement as a "view." A view may describe presentation (e.g., in a user interface) of a data arrangement generated to form or present a virtual table of, for example, rows and columns based on data extracted from multiple cached query results, whereby the data arrangement of the view may refer to query result data and need not include such data to preserve space and to facilitate expeditious querying over a network.

At 202, data representing multiple results of queries may be generated. According to some examples, data upon which one or more queries may be performed may originate at disparate computing platforms and systems, database technologies, and/or data formats, at least one of which may be referred to as a back-end architecture. In at least one example, a back-and architecture may include a computing device (e.g., a server) or an application, or both, that can be configured to generate responses (e.g., query results) based on any communication protocol (e.g., HTTP or the like). The application may be disposed at a computing device or may be implemented as an applications programming interface ("API"). Alternatively, the application may be implemented as middleware or a variant thereof. Any of the above-described disparate computing platforms and systems, database technologies, and/or data formats, or back- and architectures, may be implemented as query result generation data sources, an example of which is depicted in FIG. 1.

At 204, data representing the multiple results of queries may be stored. In some examples, the data representing the multiple results of queries may be stored in a cache memory to form a number of stored query results. An example of a memory in which the multiple results of queries may be stored is depicted in FIG. 1, which is not a limiting example.

At 206, one or more query results may be linked to one or more portions of data stored in a graph data arrangement. For example, query results, such as one of query results 122a to 122g of FIG. 1 may have at least a portion of its data stored or otherwise associated with a portion of a graph-based data format, such as portion 141 of FIG. 1. Therefore, regardless of the data format in which to query results 122a to 122g of FIG. 1 may be stored, each of the query results may have an analog stored in, or referenced by, a graph-data format. The linked data associated with query results 122a to 122g may be used to perform other queries in an effective processes, using graph-based data theory according to some examples.

At 208, data representing a query may be received. In accordance with some examples, a query may be content addressable. For example, a query may include or be associated with data that may be decoded (e.g., as one or more hashed values) to match data stored in memory (e.g., a cache memory) to identify and retrieve a subset of query results. In some cases, a location at which at least a portion of the query is stored in a cache memory may be determined. For example, a location may be determined based on identifying data representing one or more of a query, a dataset identifier, and a version identifier, one or more may be used to address (e.g., identify) a subset of query results at 210. In some cases, data representing the query may include data representing the composition of the query (e.g., text defining a query, such as an SQL query, etc.).

At 210, data representing a subset of query results associated with quiescent data values may be received. At 212, data representing quiescent data values in a subset of query results may be accessed in, for example, a cache memory. In some examples, quiescent data values for query results indicate that the associated queries either have not been executed during a period of time (e.g., query result data maintains consistency when accessed) or data associated therewith have not changed. At 214, which results for a query may be formed, for example, based on retrieved query results, which may include quiescent data values.

Figure 3:
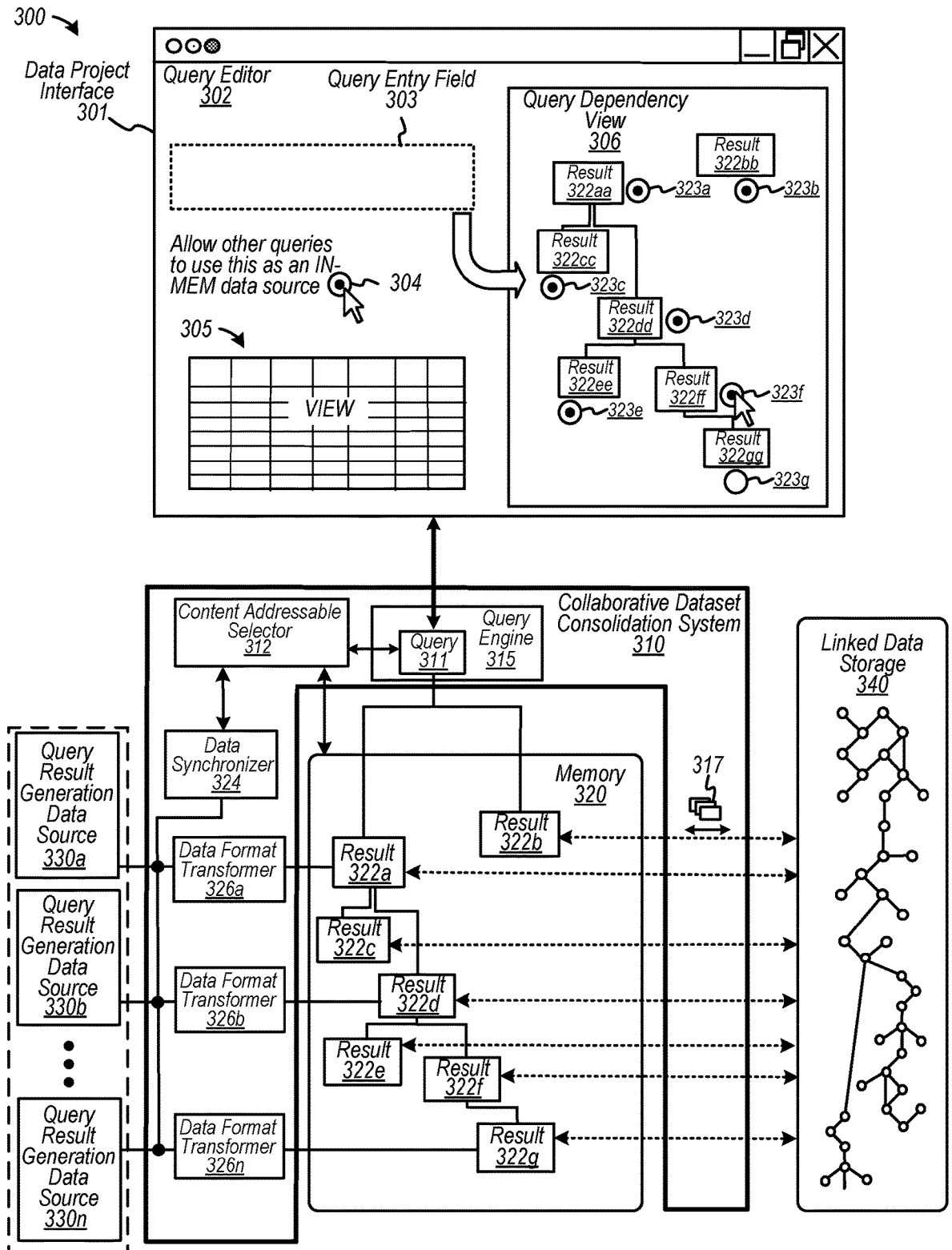
FIG. 3 is another example of a query engine configured to generate and implement content addressable query results, according to some examples.

FIG. 3 is another example of a query engine configured to generate and implement content addressable query results, according to some examples. Diagram 300 includes a data project interface 301 that includes an example of a query editor 302 configured to cause implementation of a content addressable query 313. Diagram 300 also includes a collaborative dataset consolidation system 310 in electronic data communication with a memory 320 and a linked data storage 340. Collaborative dataset consolidation system 310 may include a query engine 315 and any number of structures and/or functionalities (not shown) described or incorporated herein. Collaborative dataset consolidation system 310 and/or query engine 315 are configured to generate a query 311 based on data representing query results, such as query results ("results") 322a to 322g. One or more of query results 322a to 322g may be generated at one or more of query result generation data sources 330a, 330b, and 330n, which can include any number of query result generation data sources accessible via one or more network data communication links. One or more subsets of query result generation data sources 330a, 330b, and 330n may include a particular computing platforms and systems, database technologies, and/or data formats (e.g., query data formats), whereby multiples subsets of query result generation data sources 330a, 330b, and 330n may be different or disparate. For example, query result generation data sources 330a, 330b, and 330n may include one or more different computing platforms and systems, one or more different database technologies, and/or one or more different data formats. In some examples, at least one query result generation data source may be referred to as a back-end architecture, which may include a computing device (e.g., a server) or an application, or both. In one or more implementations, elements depicted in diagram 300 of FIG. 3 may include structures and/or functions as similarly-named or similarly-numbered elements depicted in other drawings.

A query entered into query entry field 303 of query editor 302 may cause generation of query 311 at query engine 315, whereby query engine 315 may identify and extract query results 322a to 322g from memory 320 to form query results responsive to query 311. According to some examples, query results generated responsive to query 311 may include one or more query results 322a to 322g that may be presented as a "view" 305 in data project interface 301. View 305 may be presented as a "virtualized" table of query results (generated responsive query 311) that may include query results 322a to 322g formatted in any data format, whereby view 305 may be generated based on content addressable query results (e.g., query results 322a to 322g). In some examples, logic (e.g., either hardware or software, or both) in a content addressable selector 312 may be configured to analyze query 311 to identify one or more of query results 322a to 322g (or any other query result) that may be relevant to generating query results for query 311.

In at least one example, collaborative dataset consolidation system 310 may include data format transformers 326a, 326b, and 326n (or any other similar structures and/or functions) to transform query results generated by any of query result generation data sources 330a, 330b, and 330n into one or more data formats. In at least one embodiment, query results 322a to 322g may be stored in a compressed, binary data format representative of graph-based data. In at least one embodiment, one or more query results 322a to 322g may be stored in an HDT file format, as described herein, in memory 320. In alternative examples, any of the HDT file formatted query results 322a to 322g may be stored as, for example, data 317 in data storage 340. Further, content addressable query 313 can generate or identify one or more query results 322a to 322g that may be content addressable as a function, for example, a query statement(s) (e.g., an SQL query), dataset identifier ("ID"), and dataset version, according to some examples.

According to at least one example, data synchronizer 324 includes logic (e.g., either hardware or software, or both) that may be configured to detect whether any of the underlying queries and data that generated query results 322a to 322g. In a first subset of query results 322a to 322g in which query results are quiescent, or otherwise unchanged, then data synchronizer 324 indicates that those query results may be implemented to form query results for query 311. However, a second subset of query results 322a to 322g may include transient data, whereby the corresponding query results may have changed responsive to an updated query and/or updated data applied to a query (e.g., in one or more query result generation data sources 330a, 330b, and 330n). In an instance in which at least one of the second subset of query results may be identified as transient, then query engine 315 may be configured to cause re-execution of any of query that may provide updated query results 322a to 322g.

In the example shown, data project interface 301 may be configured to present user inputs, such as user inputs 323a, 323b, 323c, 323d, 323e, 323f, 323g, in a query dependency view 306 (e.g., a portion of user interface implementing data project interface 301). User inputs 323a to 323g may be configured to present dependencies of query results as 322aa to 322gg, respectively, so that a user may understand the underlying data and queries. Note that presentation of query results 322aa to 322gg relate to corresponding query results 322a to 322g, respectively. Further, data project interface 301 includes a user input 304 to enable other users (not shown) to use query results from query 311, as well as any query results 322a to 322g, in a memory (not shown) to perform other equivalent queries.

Figure 4:
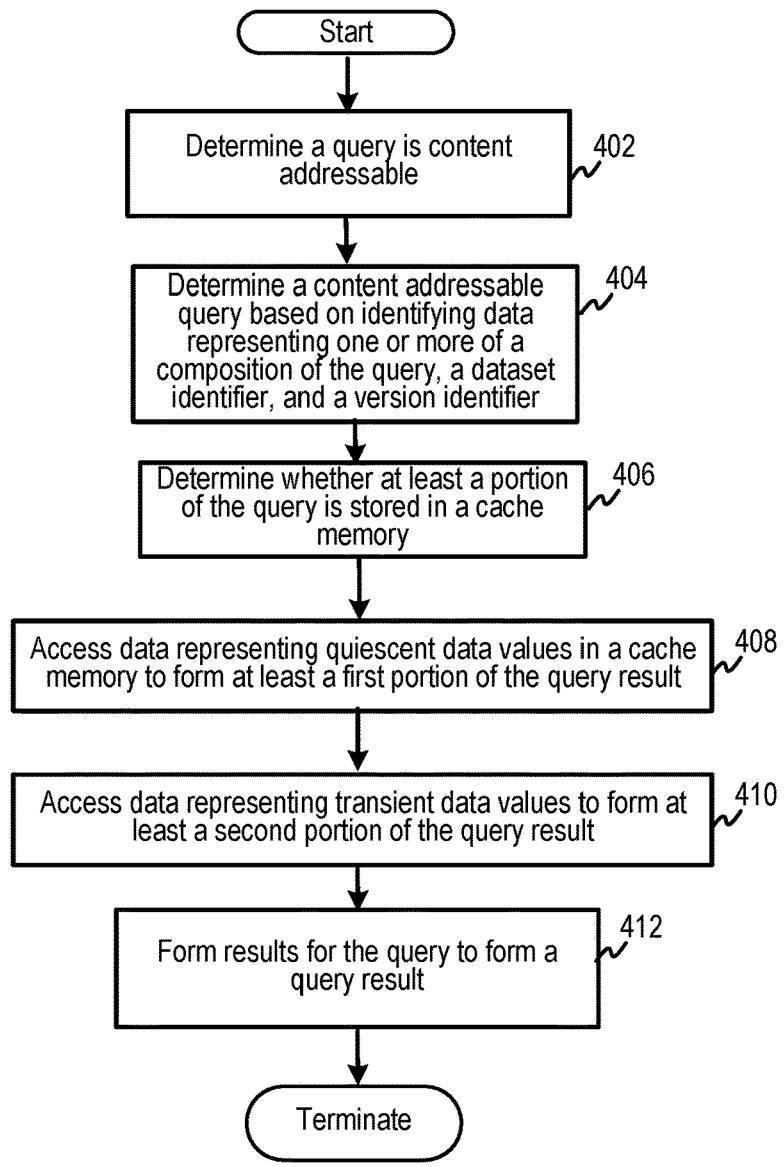
FIG. 4 is a flow diagram to determine quiescence of one or more query results in a cache memory, according to some examples.

FIG. 4 is a flow diagram to determine quiescence of one or more query results in a cache memory, according to some examples. At 402, a query may be determined to be content addressable. For example, a query may be analyzed to determine one or more query features or attributes. At 404, a content addressable query is determined based on, for example, identifying data representing a composition of a query (e.g., an SQL query including statements), a dataset identifier (e.g., a dataset ID), and a version identifier (e.g., a version ID of either a dataset or query result, or both). At 406, at least a portion of a query is determined whether it is stored in the cache memory. In at least one example, data representing one or more quiescent data values may be accessed in a cache memory at 408. In some examples, a first portion of a query may be relevant to data representing quiescent data values. At 410, at least another portion of the query may be determined to represent one or more transient data values as a second portion of the. According to some examples, detection of transient data values indicates at least one underlying query and/or query results have been modified, whereby at least one query is executed to update the query results. At 412, results responsive to a query may be formed to generate a query result.

Figure 5:
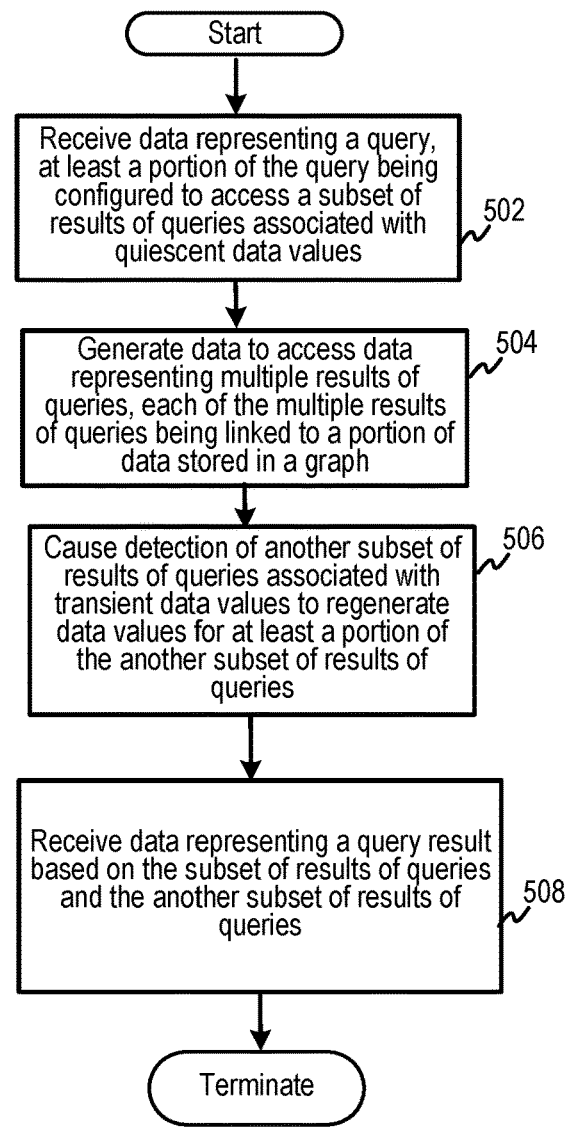
FIG. 5 is a flow diagram depicting an example to facilitate querying of interdependent query results in a cache memory, according to some examples.

FIG. 5 is a flow diagram depicting an example to facilitate querying of interdependent query results in a cache memory, according to some examples. At 502, data representing query may be received. The query may include a portion that may be configured to access a subset of results of one or more queries associated with quiescent data values (e.g., non-changing query data values). At 504, data may be generated to access data representing multiple query results. Each query result may be linked to a portion of data stored in a graph data arrangement. At 506, another subset of query results may be detected to include transient data values. Further, the query results associated with transient data values may be regenerated to update the query results. At 508, data representing a query result may be received. The query result may be based on a subset query results (based on quiescent query data values) and another subset of query results (based on transient query data values).

Figure 6:
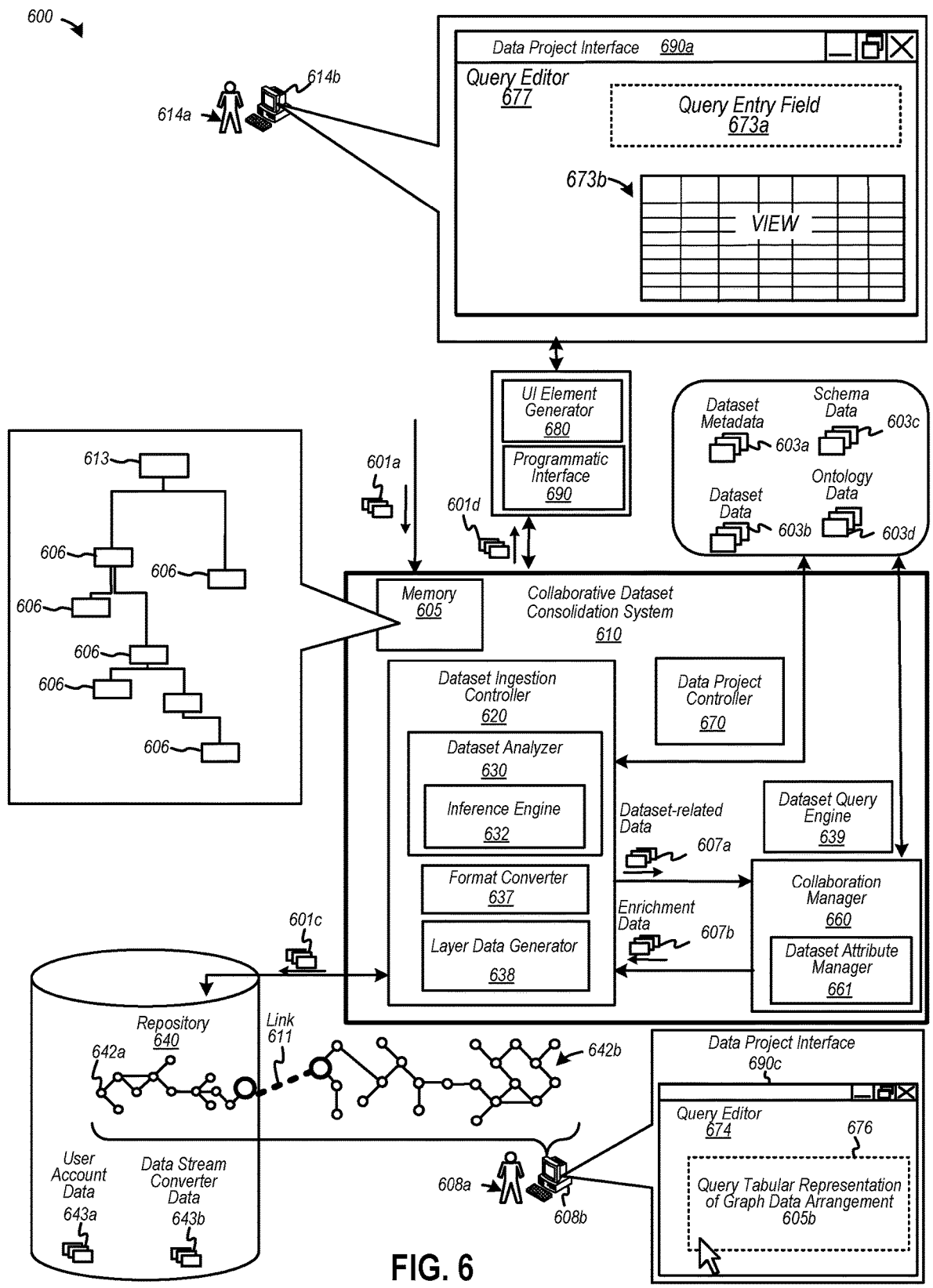
FIG. 6 is a diagram depicting another example of a collaborative dataset consolidation system configured to generate and implement content addressable query results, according to some embodiments.

FIG. 6 is a diagram depicting another example of a collaborative dataset consolidation system configured to generate and implement content addressable query results, according to some embodiments. Diagram 600 depicts an example of a collaborative dataset consolidation system 610 that may be configured to consolidate one or more datasets to form collaborative datasets as, for example, a canonical dataset. A collaborative dataset, according to some non-limiting examples, is a set of data that may be configured to facilitate data interoperability over disparate computing system platforms, architectures, and data storage devices. Further, a collaborative dataset may also be associated with data configured to establish one or more associations (e.g., metadata) among subsets of dataset attribute data for datasets and multiple layers of layered data, whereby attribute data may be used to determine correlations (e.g., data patterns, trends, etc.) among the collaborative datasets.

In some examples, data project controller 670 may be configured to control creation and evolution of a data project for managing collaborative datasets. Also, data project controller 670 may also initiate importation (e.g., at ingestion or subsequent thereto) of a dataset via dataset ingestion controller 620. In one example, one of query results 606 may be detect as including or being associated with transient data of an underlying query or modified data upon which the query result was formed. The modified data may be ingested a dataset, whereby the data may be implemented in memory 605 thereafter. Implementation of data project controller 670 to access, modify, or improve a data project may be activated via a user account associated with a computing device 614b (and/or user 614a). Data representing the user account may be disposed in repository 640 as user account data 643a. In this example, computing device 614b and user 614a may each be identified as a creator or "owner" of a dataset and/or a data project. However, initiation of data project controller 670 to access, modify, or improve a query may originate via another user account associated with a computing device 608b (and/or user 608a), who, as a collaborator, may access datasets, queries, and other data associated with a data project to perform additional analysis and information augmentation. In some examples, a collaborative computing device 608b may be configured to access query results 606 and query results generated by execution of query 613.

In some examples, datasets upon which query 613 may be applied can be ingested as data 601a, which may be received in the following examples of data formats: CSV, XML, JSON, XLS, MySQL, binary, free-form, unstructured data formats (e.g., data extracted from a PDF file using optical character recognition), etc., among others. Consider further that dataset ingestion controller 620 may receive data 601a representing a dataset, which may be formatted as a "spreadsheet data file" including multiple tables associated with each tab of a spreadsheet, according to some examples. Dataset ingestion controller 620 may arrange data in a dataset into a first data arrangement, or may identify that data in the dataset is formatted in a particular data arrangement, such as in a first data arrangement. In this example, the dataset may be disposed in a tabular data arrangement that format converter 637 may convert into a second data arrangement, such as a graph data arrangement. As such, data in a field (e.g., a unit of data in a cell at a row and column) of an ingested table may be disposed in association with a node in a graph (e.g., a unit of data as linked data). A data operation (e.g., a query, or a "join" operation based on ranked datasets identified via degrees of similarity) may be applied as either a query against a tabular data arrangement (e.g., based on a relational data model) or graph data arrangement (e.g., based on a graph data model, such as using RDF). Since equivalent data are disposed in both a field of a table and a node of a graph, either the table or the graph may be used interchangeably to enrich or supplement an ingested dataset, as well as to perform queries and other data operations. Further, equivalent data are disposed in memory 605 and one or more nodes of a graph, either of which may be used. In some cases, accessing query results 606 in memory 605 may be more quickly accessed (as cache memory). Similarly, a dataset disposed in one or more other graph data arrangements may be disposed or otherwise mapped (e.g., linked) as a dataset into a tabular data arrangement.

Collaborative dataset consolidation system 610 is shown in this example to include a dataset ingestion controller 620, a collaboration manager 660 including a dataset attribute manager 661, a dataset query engine 639 configured to manage queries, and a data project controller 670. Dataset ingestion controller 620 may be configured to ingest and convert datasets, such as a tabular data arrangement into another data format, such as into a graph data arrangement. Collaboration manager 660 may be configured to monitor updates to dataset attributes and other changes to a data project, and to disseminate the updates to a community of networked users or participants. Therefore, users 614a and 608a, as well as any other user or authorized participant, may receive communications, such as in an interactive collaborative activity feed (not shown) to discover new or recently-modified dataset-related information in real-time (or near real-time). In one example, user 608a may be notified via computing device 608b that a dataset resulting from performing a "content addressable query" may be added and joined to dataset 642a. Thus, collaboration manager 660 and/or other portions of collaborative dataset consolidation system 610 may provide collaborative data and logic layers to implement a "social network" for datasets, whereby query results 606 may be shared collaboratively. Dataset attribute manager 661 may include logic configured to detect patterns in datasets, among other sources of data, whereby the patterns may be used to identify or correlate a subset of relevant datasets that may be linked or aggregated with a dataset. Linked datasets may form a collaborative dataset that may be enriched with supplemental information from other datasets. Further, dataset query engine 639 may be configured to receive a query to apply against a one or more datasets, which may include at least a graph data arrangement. In some examples, a query may be implemented as either a relational-based query (e.g., in an SQL-equivalent query language) or a graph-based query (e.g., in a SPARQL-equivalent query language), or a combination thereof. Further, a query may be implemented as either an implicit federated query or an explicit federated query.

In at least one example, a collaborative user 608a may access via a computing device 608b a data project interface 690c in which computing device 608b may activate a user input that causes entry of a query into query entry field 673a in a query editor 677. The query entered into query entry field 673*a* may be analyzed by dataset query engine 639 to generate a content addressable query.

Note that in some examples, collaborative dataset consolidation system 610 may generate supplemental data or information, which may include, at least in some examples, information that may automatically convey (e.g., visually in text and/or graphics) dataset attributes of a created dataset or analysis of a query, including dataset attributes and derived dataset attributes, during or after (e.g., shortly thereafter) the creation or querying of a dataset. In some examples, supplemental data or information may be presented as dataset attributes in a user interface (e.g., responsive to dataset creation) may describe various aspects of a dataset, such as dataset attributes, in summary form, such as, but not limited to, annotations (e.g., metadata or descriptors describing columns, cells, or any portion of data), data classifications (e.g., a geographical location, such as a zip code, etc., or any descriptive data specifying a classification type or entity class), datatypes (e.g., string, numeric, categorical, boolean, integer, etc.), a number of data points, a number of columns, a "shape" or distribution of data and/or data values, a number of empty or non-empty cells in a tabular data structure, a number of non-conforming data (e.g., a non-numeric data value in column expecting a numeric data, an image file, etc.) in cells of a tabular data structure, a number of distinct values, as well as other dataset attributes.

Dataset analyzer 630 may be configured to analyze data file 601*a*, which may include a dataset formed from a query result, to detect and resolve data entry exceptions (e.g., whether a cell is empty or includes non-useful data, whether a cell includes non-conforming data, such as a string in a column that otherwise includes numbers, whether an image embedded in a cell of a tabular file, whether there are any missing annotations or column headers, etc.). Dataset analyzer 630 then may be configured to correct or otherwise compensate for such exceptions. Dataset analyzer 630 also may be configured to classify subsets of data (e.g., each subset of data as a column of data) in data file 601*a* representing a tabular data arrangement as a particular data classification, such as a particular data type or classification. For example, a column of integers may be classified as "year data," if the integers are formatted similarly as a number of year formats expressed in accordance with a Gregorian calendar schema. Thus, "year data" may be formed as a derived dataset attribute for the particular column. As another example, if a column includes a number of cells that each includes five digits, dataset analyzer 630 also may be configured to classify the digits as constituting a "zip code."

In some examples, an inference engine 632 of dataset analyzer 630 can be configured to analyze data file 601*a* to determine correlations among dataset attributes of data file 601*a* and other datasets 642*b* (and dataset attributes, such as metadata 603*a*). Once a subset of correlations has been determined, a dataset formatted in data file 601*a* (e.g., as an annotated tabular data file, or as a CSV file) may be enriched, for example, by associating links between a tabular data arrangement and other datasets (e.g., by joining with, or linking to, other datasets) to extend the data beyond that which is in data file 601*a*. In one example, inference engine 632 may analyze a column of data to infer or derive a data classification (e.g., a classification type as described herein) for the data in the column. In some examples, a datatype, a data classification, etc., as well any dataset attribute, may be derived based on known data or information (e.g., annotations), or based on predictive inferences using patterns in data.

Layer data generator 636 may be configured to form linkage relationships of ancillary data or descriptor data to data in the form of "layers" or "layer data files." Implementations of layer data files may facilitate the use of supplemental data (e.g., derived or added data, etc.) that can be linked to an original source dataset, whereby original or subsequent data may be preserved. As such, format converter 637 may be configured to form referential data (e.g., IRI data, etc.) to associate a datum (e.g., a unit of data) in a graph data arrangement to a portion of data in a tabular data arrangement. Thus, data operations, such as a content addressable query 613, may be applied against a datum of the tabular data arrangement as the datum in the graph data arrangement. An example of a layer data generator 636, as well as other components of collaborative dataset consolidation system 610, may be as described in U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS."

According to some embodiments, a collaborative data format may be configured to, but need not be required to, associate query results 606 stored in memory 605 in an atomized dataset. An atomized dataset may include a data arrangement in which data is stored as an atomized data point that, for example, may be an irreducible or simplest data representation (e.g., a triple is a smallest irreducible representation for a binary relationship between two data units) that are linkable to other atomized data points, according to some embodiments. As atomized data points may be linked to each other, data arrangement 642*a* may be represented as a graph, whereby associated graph-based data for each query result 606 may form a portion of a graph. In some cases, an atomized dataset facilitates merging of data irrespective of whether, for example, schemas or applications differ. Further, an atomized data point may represent a triple or any portion thereof (e.g., any data unit representing one of a subject, a predicate, or an object), according to at least some examples.

As further shown, collaborative dataset consolidation system 610 may include a dataset attribute manager 661. Dataset ingestion controller 620 and dataset attribute manager 661 may be communicatively coupled to dataset ingestion controller 620 to exchange dataset-related data 607*a* and enrichment data 607*b*, both of which may exchange data from a number of sources (e.g., external data sources) that may include dataset metadata 603*a* (e.g., descriptor data or information specifying dataset attributes), dataset data 603*b* (e.g., some or all data stored in system repositories 640, which may store graph data), schema data 603*c* (e.g., sources, such as schema.org, that may provide various types and vocabularies), ontology data 603*d* from any suitable ontology and any other suitable types of data sources. Ontology data 603*d* may include proprietary data unique to a certain organization and may be secured to prevent public access. One or more elements depicted in diagram 600 of FIG. 6 may include structures and/or functions as similarly-named or similarly-numbered elements depicted in other drawings, or as otherwise described herein, in accordance with one or more examples. Dataset attribute manager 661 may be configured to monitor changes in dataset data and/or attributes, including user account attributes. As such, dataset attribute manager 660 may monitor dataset attribute changes, such as a change in number or identity of users sharing a dataset, as well as whether a dataset has been created, modified, linked, updated, associated with a comment, associated with a request, queried, or has been associated with any other dataset interactions. Dataset attribute manager 661 may also monitor and correlate data among any number of datasets, some other examples of dataset attributes.

In the example shown if FIG. 6, dataset ingestion controller 620 may be communicatively coupled to a user interface, such as data project interface 690*a*, via one or both of a user interface ("UI") element generator 680 and a programmatic interface 690 to exchange data and/or commands (e.g., executable instructions) for facilitating a content addressable query 613 as applied to query results stored in memory 605. UI element generator 680 may be configured to generate data representing UI elements to facilitate the generation of data project interfaces 690*a* and 690*c* and graphical elements thereon. For example, UI generator 680 may cause generation UI elements, such as a container window (e.g., icon to invoke storage, such as a file), a browser window, a child window (e.g., a pop-up window), a menu bar (e.g., a pull-down menu), a context menu (e.g., responsive to hovering a cursor over a UI location), graphical control elements (e.g., user input buttons, check boxes, radio buttons, sliders, etc.), and other control-related user input or output UI elements. In some examples, a data project interface, such as data project interface 690*a* or data project interface 690*c*, may be implemented as, for example, a unitary interface window in which multiple user inputs may provide access to numerous aspects of forming or managing a data project, according to a non-limiting example.

Programmatic interface 690 may include logic configured to interface collaborative dataset consolidation system 610 and any computing device configured to present data 601*d* via, for example, any network, such as the Internet. In one example, programmatic interface 690 may be implemented to include an applications programming interface ("API") (e.g., a REST API, etc.) configured to use, for example, HTTP protocols (or any other protocols) to facilitate electronic communication. In one example, programmatic interface 690 may include a web data connector, and, in some examples, may include executable instructions to facilitate data exchange with, for example, a third-party external data analysis computerized tool. A web connector may include data stream converter data 643*b*, which, for example, may include HTML code to couple a user interface 690*a* with an external computing device. Examples of external applications and/or programming languages to perform external statistical and data analysis include "R," which is maintained and controlled by "The R Foundation for Statistical Computing" at www(dot)r-project(dot)org, as well as other like languages or packages, including applications that may be integrated with R (e.g., such as MATLAB™, Mathematica™, etc.). Or, other applications, such as Python programming applications, MATLAB™, Tableau® application, etc., may be used to perform further analysis, including visualization or other queries and data manipulation.

According to some examples, user interface ("UI") element generator 680 and a programmatic interface 690 may be implemented in association with collaborative dataset consolidation system 610, in a computing device associated with data project interfaces 690*a* and 690*c*, or a combination thereof. UI element generator 680 and/or programmatic interface 690 may be referred to as computerized tools, or may facilitate presentation of data 601*d* to form data project interface 690*a*, or the like, as a computerized tool, according to some examples. Also, UI element generator 680 and/or programmatic interface 690 may be may be configured to generate a "view" 673*b* as a virtualized table for presentation on data project interface 690*a*.

In at least one example, identifying additional datasets to enhance dataset 642*a* may be determined through collaborative activity, such as identifying that a particular dataset may be relevant to dataset 642*a* based on electronic social interactions among datasets and users. For example, data representations of other relevant dataset to which links may be formed may be made available via an interactive collaborative dataset activity feed. An interactive collaborative dataset activity feed may include data representing a number of queries associated with a dataset, a number of dataset versions, identities of users (or associated user identifiers) who have analyzed a dataset, a number of user comments related to a dataset, the types of comments, etc.). Thus, dataset 642*a* may be enhanced via "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets." In one example, collaborative dataset consolidation system 610 may be configured to detect formation of a link to supplemental data in a portion of dataset 642*b*, which may be associated with a user account (e.g., described in user account data 643*a*) and managed by computing device 608*b*. Further, collaborative dataset consolidation system 610 may generate a notification via network to transmit to computing device 608*b* so that user 608*a* may be informed, via a dataset activity feed, that activity has occurred with one of its datasets. Hence, collaboration among distributed datasets may be facilitated.

Note that the term "ingestion" may refer to an operation or a state of data with which the data is introduced and optionally converted from a tabular to a graph data format, and may have at least one subset of data yet to be classified and/or analyzed for degrees of similarity with other datasets, at least in some examples. Note, too, that a term "compressed data representation" may refer to data formed by a hash function specifically for determining classification or a degree of similarity, or may refer to data formed by a hash function that produces a result that may be used in both determining classification imagery of similarity, at least in some examples. A "compressed data representation" may be produced by a hash function or any compression techniques, and a "compressed data representation" may be used or implemented to address query results stored in a memory in a content addressable query, as described herein.

According to various embodiments, one or more structural and/or functional elements described in FIG. 6 or herein may be implemented in hardware or software, or both. Examples of one or more structural and/or functional elements described herein may be implemented as set forth in one or more of U.S. patent application Ser. No. 15/186,514, filed on Jun. 19, 2016, and titled "COLLABORATIVE DATASET CONSOLIDATION VIA DISTRIBUTED COMPUTER NETWORKS," U.S. patent application Ser. No. 15/454,923, filed on Mar. 9, 2017, and titled "COMPUTERIZED TOOLS TO DISCOVER, FORM, AND ANALYZE DATASET INTERRELATIONS AMONG A SYSTEM OF NETWORKED COLLABORATIVE DATASETS," and U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS," each of which is herein incorporated by reference.

Figure 7:
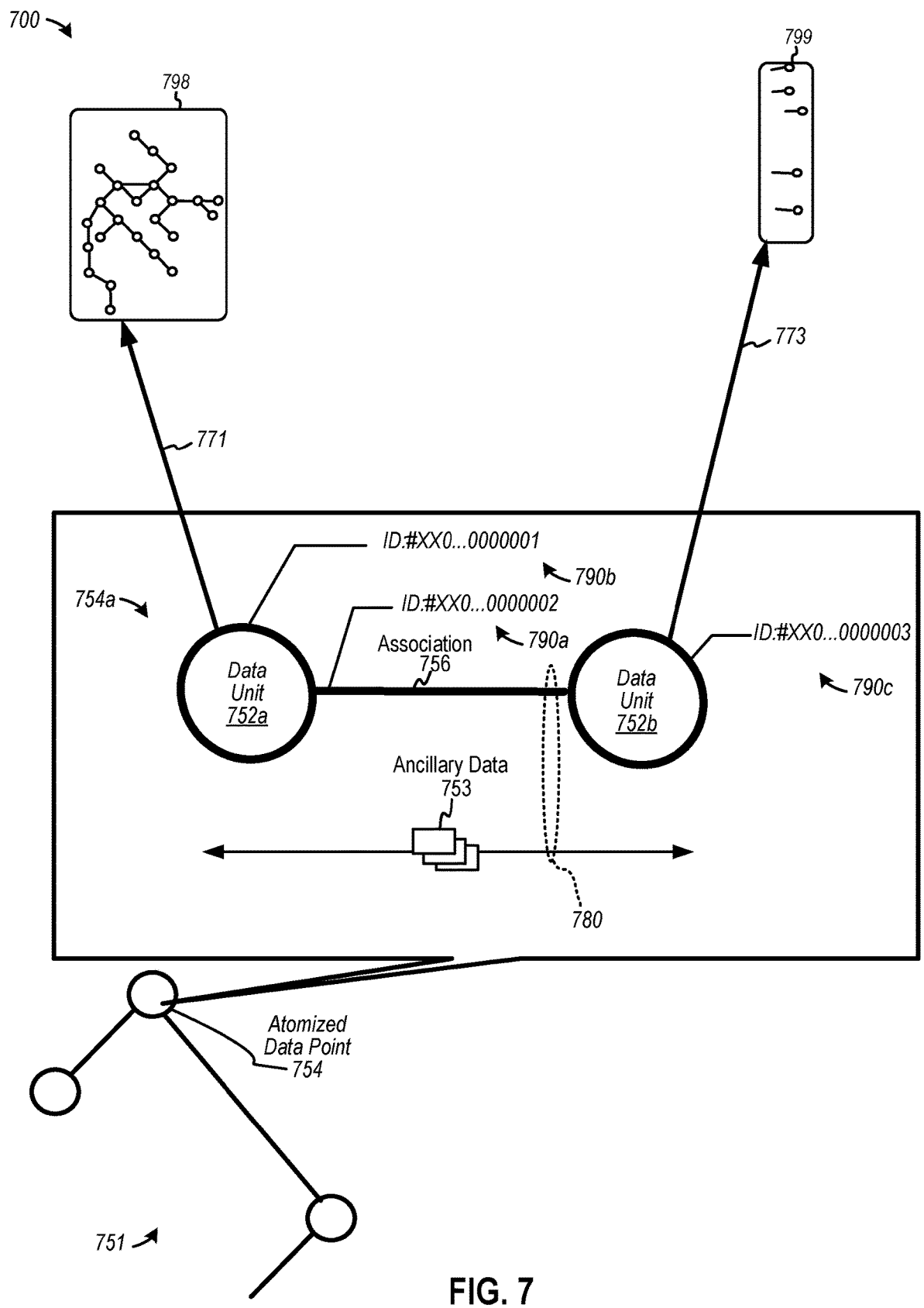
FIG. 7 is a diagram depicting an example of an atomized data point linking datasets based on a query result, according to some embodiments.

FIG. 7 is a diagram depicting an example of an atomized data point linking datasets based on a query result, according to some embodiments. In some examples, an atomized dataset may be formed by converting a tabular data format into a format associated with the atomized dataset. In some cases, portion 751 of an atomized dataset can describe a portion of a graph that includes one or more subsets of linked data. Further to diagram 700, one example of atomized data point 754 is shown as a data representation 754a, which may be represented by data representing two data units 752a and 752b (e.g., objects) that may be associated via data representing an association 756 with each other. One or more elements of data representation 754a may be configured to be individually and uniquely identifiable (e.g., addressable), either locally or globally in a namespace of any size. For example, elements of data representation 754a may be identified by identifier data 790a, 790b, and 790c (e.g., URIs, URLs, IRIs, etc.).

Diagram 700 depicts a portion 751 of an atomized dataset that includes an atomized data point 754a, which includes links formed to facilitate identifying relevant data of an ingested dataset with one or more linked datasets, according to some examples. In this example, atomized data point 754a may form a link from a dataset to another dataset responsive to generating a query result as described herein. The data representing the identifiers may be disposed within a corresponding graph data arrangement based on a graph data model. In diagram 700, graph data portion 798 of associated with a query result 122a of FIG. 1 may be linked via link 771 to node 752a, which, in turn, may be linked from node 752b via link 773 to another graph data portion 799, which may be associated with another query result 122d of FIG. 1. Any of links 771 and 773 may be removed if a corresponding dataset identifier is disassociated from a data project. In some examples, removal of one of links 771 and 773 may generate a new version of a data project, whereby the removed link may be preserved for at least archival purposes. Note, too, that while a first entity (e.g., a dataset owner) may exert control and privileges over portion 751 of an atomized dataset that includes atomized data point 754, a collaborator-user or a collaborator-computing device may user or form any of links 771 and 773.

In some embodiments, atomized data point 754a may be associated with ancillary data 753 to implement one or more ancillary data functions. For example, consider that association 756 spans over a boundary between an internal dataset, which may include data unit 752a, and an external dataset (e.g., external to a collaboration dataset consolidation), which may include data unit 752b. Ancillary data 753 may interrelate via relationship 780 with one or more elements of atomized data point 754a such that when data operations regarding atomized data point 754a are implemented, ancillary data 753 may be contemporaneously (or substantially contemporaneously) accessed to influence or control a data operation. In one example, a data operation may be a query and ancillary data 753 may include data representing authorization (e.g., credential data) to access atomized data point 754a at a query-level data operation (e.g., at a query proxy during a query). Thus, atomized data point 754a can be accessed if credential data related to ancillary data 753 is valid (otherwise, a request to access atomized data point 754a (e.g., for forming linked datasets, performing analysis, a query, or the like) without authorization data may be rejected or invalidated). According to some embodiments, credential data (e.g., passcode data), which may or may not be encrypted, may be integrated into or otherwise embedded in one or more of identifier data 790a, 790b, and 790c. Ancillary data 753 may be disposed in other data portion of atomized data point 754a, or may be linked (e.g., via a pointer) to a data vault that may contain data representing access permissions or credentials.

Atomized data point 754a may be implemented in accordance with (or be compatible with) a Resource Description Framework ("RDF") data model and specification, according to some embodiments. An example of an RDF data model and specification is maintained by the World Wide Web Consortium ("W3C"), which is an international standards community of Member organizations. In some examples, atomized data point 754a may be expressed in accordance with Turtle (e.g., Terse RDF Triple Language), RDF/XML, N-Triples, N3, or other like RDF-related formats. As such, data unit 752a, association 756, and data unit 752b may be referred to as a "subject," "predicate," and "object," respectively, in a "triple" data point (e.g., as linked data). In some examples, one or more of identifier data 790a, 790b, and 790c may be implemented as, for example, a Uniform Resource Identifier ("URI"), the specification of which is maintained by the Internet Engineering Task Force ("IETF"). According to some examples, credential information (e.g., ancillary data 753) may be embedded in a link or a URI (or in a URL) or an Internationalized Resource Identifier ("IRI") for purposes of authorizing data access and other data processes. Therefore, an atomized data point 754 may be equivalent to a triple data point of the Resource Description Framework ("RDF") data model and specification, according to some examples. Note that the term "atomized" may be used to describe a data point or a dataset composed of data points represented by a relatively small unit of data. As such, an "atomized" data point is not intended to be limited to a "triple" or to be compliant with RDF; further, an "atomized" dataset is not intended to be limited to RDF-based datasets or their variants. Also, an "atomized" data store is not intended to be limited to a "triplestore," but these terms are intended to be broader to encompass other equivalent data representations.

Examples of triplestores suitable to store "triples" and atomized datasets (or portions thereof) include, but are not limited to, any triplestore type architected to function as (or similar to) a BLAZEGRAPH triplestore, which is developed by Systap, LLC of Washington, D.C., U.S.A.), any triplestore type architected to function as (or similar to) a STARDOG triplestore, which is developed by Complexible, Inc. of Washington, D.C., U.S.A.), any triplestore type architected to function as (or similar to) a FUSEKI triplestore, which may be maintained by The Apache Software Foundation of Forest Hill, Md., U.S.A.), and the like.

Figure 8:
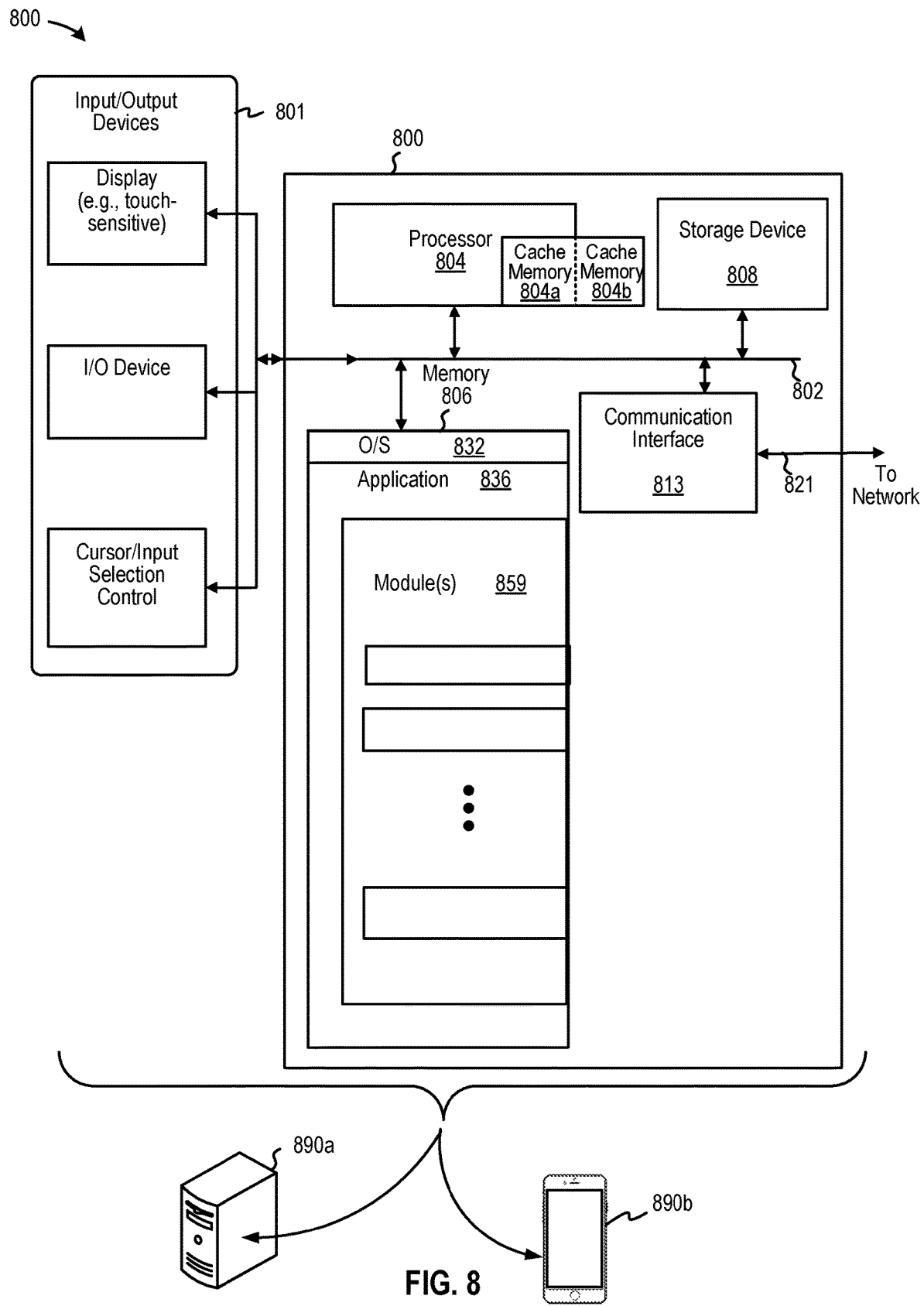
FIG. 8 illustrates examples of various computing platforms configured to provide various functionalities to any of one or more components of a collaborative dataset consolidation system, according to various embodiments.

FIG. 8 illustrates examples of various computing platforms configured to provide various functionalities to any of one or more components of a collaborative dataset consolidation system, according to various embodiments. In some examples, computing platform 800 may be used to implement computer programs, applications, methods, processes, algorithms, or other software, as well as any hardware implementation thereof, to perform the above-described techniques.

In some cases, computing platform 800 or any portion (e.g., any structural or functional portion) can be disposed in any device, such as a computing device 890a, mobile computing device 890b, and/or a processing circuit in association with initiating the formation of collaborative datasets, as well as identifying relevant data of an ingested dataset with one or more linked datasets, according to various examples described herein.

Computing platform 800 includes a bus 802 or other communication mechanism for communicating information, which interconnects subsystems and devices, such as processor 804, system memory 806 (e.g., RAM, etc.), storage device 808 (e.g., ROM, etc.), an in-memory cache, such as cache memory 804a (e.g., L1 cache integrated with processor 804, such as an on-board cache) or cache memory 804b (e.g., L2 and/or L3 cache memories 804b), whereby cache memory 804a or 804b may be implemented in RAM 806 or other portions of computing platform 800 (in some examples), a communication interface 813 (e.g., an Ethernet or wireless controller, a Bluetooth controller, NFC logic, etc.) to facilitate communications via a port on communication link 821 to communicate, for example, with a computing device, including mobile computing and/or communication devices with processors, including database devices (e.g., storage devices configured to store atomized datasets, including, but not limited to triplestores, etc.). Processor 804 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 800 exchanges data representing inputs and outputs via input-and-output devices 801, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 801 may be implemented as, or otherwise substituted with, a user interface in a computing device associated with a user account identifier in accordance with the various examples described herein.

According to some examples, computing platform 800 performs specific operations by processor 804 executing one or more sequences of one or more instructions stored in system memory 806, and computing platform 800 can be implemented in a client-server arrangement, peer-to-peer arrangement, or as any mobile computing device, including smart phones and the like. Such instructions or data may be read into system memory 806 from another computer readable medium, such as storage device 808, or any other data storage technologies, including blockchain-related techniques. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks and the like. Volatile media includes dynamic memory, such as system memory 806.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by computing platform 800. According to some examples, computing platform 800 can be coupled by communication link 821 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 800 may transmit and receive messages, data, and instructions, including program code (e.g., application code) through communication link 821 and communication interface 813. Received program code may be executed by processor 804 as it is received, and/or stored in memory 806 or other non-volatile storage for later execution.

In the example shown, system memory 806 can include various modules that include executable instructions to implement functionalities described herein. System memory 806 may include an operating system ("O/S") 832, as well as an application 836 and/or logic module(s) 859. In the example shown in FIG. 8, system memory 806 may include any number of modules 859, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. In some examples, the described techniques may be implemented as a computer program or application (hereafter "application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including Python™, ASP, ASP.net, .Net framework, Ruby, Ruby on Rails, C, Objective C, C++,C #, Adobe® Integrated Runtime™ (Adobe® AIR™), ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc. The described techniques may be varied and are not limited to the embodiments, examples or descriptions provided.

As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit.

According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 859 of FIG. 8, or one or more of their components, or any process or device described herein, can be in communication (e.g., wired or wirelessly) with a mobile device, such as a mobile phone or computing device, or can be disposed therein. In some cases, a mobile device, or any networked computing device (not shown) in communication with one or more modules 859 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided. Further, none of the above-described implementations are abstract, but rather contribute significantly to improvements to functionalities and the art of computing devices.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
   generating data representing multiple results of queries;
   decomposing a query into one or more query portions, each of the one or more query portions being associated with one or more results of queries, the data being atomized into one or more triples and the data being used to perform the decomposing, the data being ingested at an ingestion controller;
   storing the data representing the multiple results of queries to form stored results of queries;
   linking each of the multiple results of queries to a portion of the data stored in a graph;
   receiving other data representing another query;
   determining a subset of results of queries associated with quiescent data values, the quiescent data values including a non-transient data value during a period of time;
   accessing the data representing the quiescent data values;
   forming results for the query to form a query result, the query result being dynamically generated by omitting one or more computational resources associated with the quiescent data values when the query result is formed;
   determining another subset of results of queries associated with transient data values;
   detecting the transient data values include a change in data values in at least one portion of the another subset of results of queries; and
   regenerating the data values associated with the at least one portion of the another subset of results of queries.

2. The method of claim 1 wherein forming the results for the query comprises:
   accessing the data representing the quiescent data values in memory.

3. The method of claim 1 wherein the quiescent data values comprises:
   static data.

4. The method of claim 1 further comprising:
   determining the query is content addressable.

5. The method of claim 4 further comprising:
   determining whether at least a portion of the query is stored in a cache memory; and
   accessing the data representing the quiescent data values in the cache memory to form at least a portion of the query result.

6. The method of claim 4 further comprising:
   determining a content addressable query based on identifying data representing one or more of a composition of the query, a dataset identifier, and a version identifier.

7. The method of claim 4 further comprising:
   determining the subset of results of queries are addressable.

8. The method of claim 1 further comprising: executing a query to form an updated subset of data to substitute into the at least one portion of the another subset of results of queries.

9. The method of claim 1 wherein storing the data representing the multiple results of queries comprises:
   storing data representing the stored results of queries in cache memory.

10. The method of claim 1 further comprising:
    receiving data representing a permission to implement a result of a query as a dataset.

11. The method of claim 1 further comprising:
generating data representing a user input to present in a user interface, the user input configured to specify activation of the permission to implement the result of a query as the dataset.

12. An apparatus comprising:
a memory including executable instructions; and
a processor, responsive to executing the instructions, is configured to:
generate data representing multiple results of queries;
decompose a query to generate the multiple results of queries into one or more query portions, each of the one or more query portions being associated with one or more results of queries, the data being atomized into one or more triples and the data being used to perform the decomposing, the data being ingested at an ingestion controller;
store the data representing the multiple results of queries to form stored results of queries;
link each of the multiple results of queries to a portion of data stored in a graph;
receive other data representing another query;
determine a subset of results of queries associated with quiescent data values, the quiescent data values including a non-transient data value during a period of time;
access data representing the quiescent data values;
form results for the query to form a query result, the query result being dynamically generated by omitting one or more computational resources associated with the quiescent data values when the query result is formed;
determine another subset of results of queries associated with transient data values;
detect the transient data values include a change in data values in at least one portion of the another subset of results of queries; and
regenerate the data values associated with the at least one portion of the another subset of results of queries.

13. The apparatus of claim 12 wherein a subset of the instructions to cause the processor to form results for the query comprises further instructions to cause the processor to:
access the data representing the quiescent data values in memory.

14. The apparatus of claim 12 wherein the processor is further configured to:
determine whether at least a portion of the query is stored in a cache memory; and
access the data representing the quiescent data values in the cache memory to form at least a portion of the query result.

15. A method comprising:
receiving data representing a query, at least a portion of the query being configured to access a subset of results of queries associated with quiescent data values, the quiescent data values including a non-transient data value during a period of time, the subset of results of queries including a query result dynamically generated by omitting one or more computational resources associated with the quiescent data values when the query result is formed;
generating data to access data representing multiple results of queries, each of the multiple results of queries being linked to a portion of data stored in a graph;
decomposing the query into one or more query portions, each of the one or more query portions being associated with one or more results of queries, the data being atomized into one or more triples and the data being used to perform the decomposing, the data being ingested at an ingestion controller;
causing detection of another subset of results of queries associated with transient data values to regenerate data values for at least a portion of the another subset of results of queries;
receiving other data representing another query result based on the subset of results of queries and the another subset of results of queries;
determining another subset of results of queries associated with transient data values;
detecting the transient data values include a change in data values in at least one portion of the another subset of results of queries; and
regenerating the data values associated with the at least one portion of the another subset of results of queries.

16. The method of claim 15 comprising:
determining the query is content addressable.

* * * * *